US006697818B2

(12) United States Patent
Li et al.

(10) Patent No.: US 6,697,818 B2
(45) Date of Patent: Feb. 24, 2004

(54) METHODS AND APPARATUS FOR CONSTRUCTING AND IMPLEMENTING A UNIVERSAL EXTENSION MODULE FOR PROCESSING OBJECTS IN A DATABASE

(75) Inventors: Chung-Sheng Li, Ossining, NY (US); John R. Smith, New Hyde Park, NY (US); Yuan-Chi Chang, Ossining, NY (US); Anant D. Jhingran, San Jose, CA (US); Sriram K. Padmanabhan, Briarcliff Manor, NY (US); Hui-I Hsiao, Saratoga, CA (US); David Mun-Hien Choy, Los Altos, CA (US); Jy-Jine James Lin, Cupertino, CA (US); Gene Y. C. Fuh, San Jose, CA (US); Robin Williams, San Jose, CA (US); Lawrence D. Bergman, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 144 days.

(21) Appl. No.: 09/881,265

(22) Filed: Jun. 14, 2001

(65) Prior Publication Data

US 2002/0198891 A1 Dec. 26, 2002

(51) Int. Cl.[7] ................................................ G06F 17/30
(52) U.S. Cl. .................................. 707/103 R; 707/102
(58) Field of Search ............................. 707/1, 2, 3, 4, 707/5, 6, 7, 8, 9, 10, 101, 102, 103 R, 104, 513; 717/143, 115

(56) References Cited

U.S. PATENT DOCUMENTS 6,122,628 A    9/2000   Castelli et al.
6,377,953 B1 * 4/2002   Gawlick et al. ............ 707/102
6,418,448 B1 * 7/2002   Sarkar ...................... 707/104.1
6,446,256 B1 * 9/2002   Hyman et al. .............. 717/143

OTHER PUBLICATIONS

U.S. patent application Ser. No. 09/360,366, Bergman et al., filed Jul. 23, 1999, "Multidimensional Indexing Structure for Use with Linear Optimization Queries."
U.S. patent application Ser. No. 09/237,646, V. Castelli et al., filed Jan. 26, 1999, "Method and Apparatus for Similarity Retrieval from Iterative Refinement."
U.S. patent application Ser. No. 09/237,734, L.D. Bergman et al., filed Jan. 26, 1999, "System and Method for Sequential Processing for Content-Based Retrieval of Composite Objects."

* cited by examiner

Primary Examiner—Diane D. Mizrahi
Assistant Examiner—Yicun Wu
(74) Attorney, Agent, or Firm—Thu Ann Dang; Ryan, Mason & Lewis, LLP

(57) ABSTRACT

Methods and apparatus for providing a multi-tier object-relational database architecture are disclosed. In one illustrative embodiment of the present invention, a multi-tier database architecture comprises an object-relational database engine as a top tier, one or more domain-specific extension modules as a bottom tier, and one or more universal extension modules as a middle tier. The individual extension modules of the bottom tier operationally connect with the one or more universal extension modules which, themselves, operationally connect with the database engine. The domain-specific extension modules preferably provide such functions as search, index, and retrieval services of images, video, audio, time series, web pages, text, XML, spatial data, etc. The domain-specific extension modules may include one or more IBM DB2 extenders, Oracle data cartridges and/or Informix datablades, although other domain-specific extension modules may be used.

19 Claims, 37 Drawing Sheets

FIG. 4

| | PRECISE (410) | FUZZY (412) |
|---|---|---|
| JOIN (402) | SELECT * FROM TBL1,TBL2 WHERE TBL1.ATTR=20,TBL2.ATTR>30 | SELECT * FROM TXT_TBL,IMG_TBL WHERE TXT~"KEYWORD", PRIMARY_COLOR~"GREEN" |
| LOGICAL COMPOSITION (404) | FOREST = MAPLE AND AGE > 100 | COLOR~GREEN FUZZY AND TEXTURE~WOODEN |
| SPATIAL COMPOSITION (406) | AGRICULTURE AREA WITHIN 10 MILES FROM LAKE GEORGE | AGRICULTURE AREA TO THE WEST OF THE RIVER |
| TEMPORAL COMPOSITION (408) | STOCK SPLIT EVENTS SINCE 1997 | BRIGHTENING REGIONS WHERE BRIGHTENING FUZZY COINCIDE WITH ENLARGING |

FIG. 9A

| SERVER |
|---|
| TXICRT |
| TXIDROP |
| TXNADD |
| TXNCHECK |
| TXNDROP |
| TXSAMPLE |
| TXSTART |
| TXSTATUS |
| TXSTOP |
| TXTRACE |
| TXVERIFY |

FIG. 9B

| CLIENT | |
|---|---|
| ? | ENABLE TEXT FILES |
| CHANGE INDEX SETTING | ENABLE TEXT TABLE |
| CHANGE TEXT CONFIGURATION | GET ENVIRONMENT |
| CONNECT | GET INDEX SETTING |
| DELETE INDEX EVENTS | GET INDEX STATUS |
| DISABLE DATABASE | GET STATUS |
| DISABLE TEXT COLUMN | GET TEXT CONFIGURATION |
| DISABLE TEXT FILES | GET TEXT INFO |
| DISABLE TEXT TABLE | QUIT |
| ENABLE DATABASE | RESET INDEX STATUS |
| ENABLE TEXT COLUMN | UPDATE INDEX |

FIG. 10A

| UDT | SOURCE DATA TYPE |
|---|---|
| DB2TEXTH | VARCHAR(60) FOR BIT DATA |
| DB2TEXTFH | VARCHAR(210) FOR BIT DATA |
| DB2TEXTHLISTP | VARCHAR(16) FOR BIT DATA |
| DB2TEXTFHLISTP | VARCHAR(16) FOR BIT DATA |

FIG. 10B

| UDF |
|---|
| CCSID |
| CONTAINS |
| FILE |
| FORMAT |
| HANDLE |
| HANDLE_LIST |
| INIT_TEXT_HANDLE |
| LANGUAG |
| NO_OF_DOCUMENTS |
| NO_OF_MATCHES |
| RANK |
| REFINE |
| SEARCH_RESULT |

FIG. 11

| DESCLOSEDDOCUMENT | DESENDBROWSESESSION | DESFREEBROWSEINFO | DESGETBROWSEINFO | DESGETMATCHES | DESGETSEARCHRESULTTABLE | DESOPENDOCUMENT | DESSTARTBROWSESESSION |
|---|---|---|---|---|---|---|---|

| DOCID | ... | COMMENT |
|---|---|---|
| DOC1 | | CUSTOMER IS... |
| DOC2 | | AFTER RECHECKING |

1202

| DOCID | ... | COMMENT | COMMENT HANDLE |
|---|---|---|---|
| DOC1 | | CUSTOMER IS... | X'..HANDLE..' |
| DOC2 | | AFTER RECHECKING | X'..HANDLE..' |

FIG. 14

1401:
```
SELECT DATE, SUBJECT
FROM DB2TX.SAMPLE
WHERE DB2TX.CONTAINS (COMMENTHANDLE, '"COMPRESS"')=1
```

1402:
```
WITH TEMPTABLE(DATE, SUBJECT, MATCHES)
  AS (SELECT DATE, SUBJECT,
             DB2TX.NO_OF_MATCHES(COMMENTHANDLE,'"COMPRESS"')
      FROM DB2TX.SAMPLE)
SELECT *
FROM TEMPTABLE
WHERE MATCHES > 0
```

FIG. 16A

| UDT | SOURCE DATA TYPE |
|---|---|
| DB2IMAGE | VARCHAR(250) |
| DB2AUDIO | VARCHAR(250) |
| DB2VIDEO | VARCHAR(250) |

FIG. 16B

| | |
|---|---|
| ALIGNVALUE | IMPORTTIME |
| ASPECTRATIO | MAXBYTESPERSEC |
| BITSPERSAMPLE | NUMAUDIOTRACKS |
| BYTESPERSEC | NUMCHANNELS |
| COMMENT | NUMCOLORS |
| COMPRESSTYPE | NUMFRAMES |
| CONTENT | NUMVIDEOTRACKS |
| DB2AUDIO | QBSCOREFROMNAME |
| DB2IMAGE | QBSCOREFROMSTRING |
| DB2VIDEO | QBSCORETBFROMNAME |
| DURATION | QBSCORETBFROMSTR |
| FILENAME | REPLACE |
| FINDINSTRUMENT | SAMPLINGRATE |
| FINDTRACKNAME | SIZE |
| FORMAT | THUMBNAIL |
| FRAMERATE | TICKSPERQNOTE |
| GETINSTRUMENTS | TICKSPERSEC |
| GETTRACKNAME | UPDATER |
| HEIGHT | UPDATETIME |
| IMPORTER | WIDTH |

FIG. 17

```
CHAR         FEATURENAME[QBIMAXFEATURENAME];
QBQUERYHANDLE QHANDLE;
QBIMAGESOURCE IMGSOURCE;

IMGSOURCE.TYPE=QBSOURCE_CLIENTFILE;
STRCPY(IMGSOURCE.CLIENTFILE.FILENAME,"/TMP/IMG.GIF");
STRCPY(IMGSOURCE.CLIENTFILE.FORMAT,"GIF");

RC=QBQUERYSETFEATUREDATA(
          QHANDLE,
          "QBCOLORHISTOGRAMFEATURECLASS",
          &IMGSOURCE);
```
1701

```
QBRESULT      RETURNS[MAXQUERYRETURNS];
SQLINTEGER    MAXRESULTS=QBIMAXQUERYRETURNS;
SQLINTERGER   COUNT;
QBQUERYHANDLE QHANDLE;
QBRESULT      RESULTS[QBIMAXQUERYRETURNS];

RC=QBQUERYSEARCH(
          QHANDLE,
          "EMPLOYEE",
          "PICTURE",
          MAXRESULTS,
          0,
          QBIARRAY,
          &COUNT,
          RESULTS);
```
1702

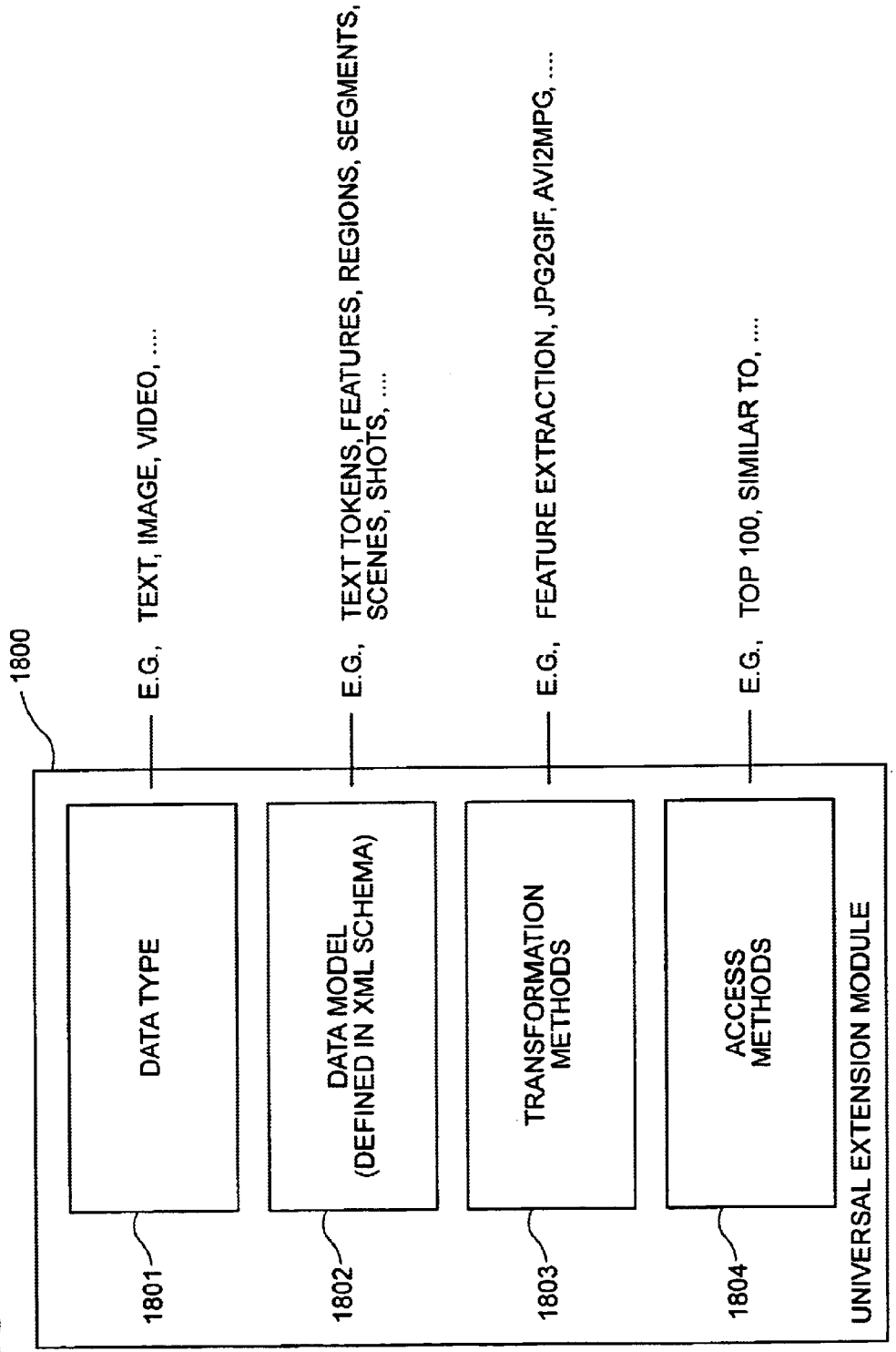

METHODS AND APPARATUS FOR CONSTRUCTING AND IMPLEMENTING A UNIVERSAL EXTENSION MODULE FOR PROCESSING OBJECTS IN A DATABASE

This invention was made with U.S. Government support under contract no. NCC5-305 awarded by the National Aeronautic and Space Administration (NASA). The U.S. Government may have certain rights in this invention.

FIELD OF THE INVENTION

The present invention relates to database management systems and, more particularly, to methods and apparatus for extending relational and object-relational database management systems.

BACKGROUND OF THE INVENTION

A database system usually comprises database clients connecting through a network (e.g., Internet, Intranet, etc.) to one or more database servers managed by database management systems (DBMSs). Such an arrangement is shown in FIG. 1. As shown, a database client (computer system) 102 is connected to one or more DBMSs (computer systems) 101-1 through 101-N (each DBMS including one or more database servers) via a communications network 103. It is known that virtually all of the business data handled by database systems, such as data generated by retail sales, falls into the category of structured data. Structured data is data that is present in a structured format, such as data tables in a relational database or spreadsheet. As non-structured data (such as text, time series, images, audio, and video) and semi-structured data (such as HyperText Markup Language (HTML), Extensible Markup Language (XML), and other tagged documents) begin to become prevalent, a database management system has to substantially change its access and search capabilities in order to efficiently manage these types of data.

A taxonomy of different data types and examples is illustrated in FIG. 2. As shown in FIG. 2, data 200 can be categorized as structured 202, non-structured 204 and semi-structured 206. As mentioned, an example of structured data is data in a relational table spreadsheet, while examples of semi-structured data include XML data and HTML data. Non-structured data can be further categorized as vectors 208, lattice 210 and text 212. Vectors may include lines 214 and polygons 216 used in various Geographic Information Systems (GIS). Lattice data may include 1-dimensional data 218 (such as audio and time-series data), 2-dimensional data 220 (such as images, photos), 2-dimensional plus time data 222 (such as video), 3-dimensional data 224 (such as magnetic resonance image (MRI) data, CT (computer tomography) data, seismic data) and 3-dimensional plus time data 226 (such as climate model simulation output data).

To facilitate accessing and managing both non-structured and semi-structured data, database vendors have begun to use an object-relational approach to enhance and enrich the data types that can be handled and managed. An object-relational data model allows the attributes of a relational table to be an abstract data type, which can include both complex data structures and access methods to these structures. This methodology allows the application builder to store data based on new data types and access methods into a relational table. Modules comprising predefined data types and methods have also been developed to facilitate the access of those data types taxonomized in FIG. 2. Currently, all of the commercially-available major object-relational databases have provided a two-tier architecture: (1) a relational database engine; and (2) extension modules. Examples of extension modules include extenders used in IBM Corporation's DB2 database, data cartridges used by the Oracle database, and datablades used by the Informix database. These extension modules take advantage of both user-defined data types (and abstract data types in some of the newer versions of the databases) and user-defined functions (UDFs) enabled by the database engine to extend the capability of the relational database engine. Most of the extension modules (extenders, datablades, and data cartridges) are in the area of non-structured and semi-structured data management such as images, video, spatial data, text, and the recently emerging XML data.

This approach, however, has the following drawbacks:

(1) Query optimization involving UDFs: Query optimization involving UDFs from extenders/datablades/data cartridges is difficult and sometimes impossible due to the wide varying possibilities for estimating the cost function. In general, sub-queries with high selectivity and low computation cost are prioritized over sub-queries with low selectivity and high computation cost during query optimization. This methodology is applicable to precise constraints (including precise range queries). However, this optimization methodology has difficulties in dealing with fuzzy constraints and, in general, can not deal with similarity queries where all the objects in the database are candidates. In particular, query optimizers within any of the existing object-relational databases can not handle queries involving fuzzy Cartesian operators.

(2) Developing new extenders from existing search engines: Currently, each of the object-relational databases has relatively rigid APIs (application programming interfaces), and it is a tremendous effort to develop necessary "glues" for transforming an existing search engine into an extender/datablade/data cartridge. It is to be understood that the term glue, as well as the term "wrappers," refer to the software code necessary to transform a set of APIs to another set of APIs. A standard search engine has its own APIs which might not observe the programming models used in a database. As a result, software wrappers or glue are needed to transform the API from the search engine to the software environment needed by a database.

In the following discussion, we further elaborate on the first problem (query optimization). FIG. 3 illustrates an example of querying non-structured data such as images. The coarsest level of retrieval (coarse grain access) is the entire non-structured document, such as the whole image as shown in block 301. It is also possible to retrieve a sub-region of an image (e.g., facial region) as shown in block 302. Many emerging applications require retrieving at the object (e.g., tree, car, person) level (fine grain access) as shown in block 303. As the size of the document becomes increasingly large, object-level retrieval will also become increasingly important. Retrieval of the document, sub-document, or object based on meta-data other than a conventional data type requires the use of user-defined data types and user-defined functions. Both IBM and Informix have extenders and datablades, respectively, for performing this kind of access. However, the access of non-structured data is usually based on similarity measures such as Euclidean distance. This implies that all the entries within a database can be considered as candidates, and a very different set of criteria (as opposed to those used in a relational database) need to be adopted to prune search results. Currently, all existing object-relational databases have to go through the following process to combine query results from SQL (Standard Query Language) and from extension modules:

(1) request a pre-determined number of results (say the top 1000) from those extension modules (extenders, data cartridges, or datablades) which access non-structured data;

(2) rank the returned results based on a similarity measure (such as the Euclidean distance between the query and the retrieved result); and (3) combine the returned results with other sub-queries that are processed through SQL.

However, this strategy may not yield the correct results when results from multiple extenders need to be combined (because of premature pruning by each extension module). Furthermore, the process of joining results from relational operations with those from extension modules encounters similar difficulties in producing the correct results.

FIG. 4 provides a taxonomy of different queries which challenge existing relational query paradigms. Four types of queries are listed here: "Join (denoted as 402)," "Logical Composition (denoted as 404)," "Spatial Composition (denoted as 406)" and "Temporal Composition (denoted as 408)." Existing relational mechanisms based on standard SQL queries can already handle the precise queries 410 in the tables. The fuzzy queries 412 in the table, however, require extensions which are mostly absent from existing relational engines.

An example of a spatial composition query is further illustrated in FIGS. 5 and 6. This query is searching for "objects" that are similar to "delta lobe" which comprises three "sub-objects": shale 501; sandstone 502; and siltstone 503. Each of these sub-objects in this query is defined by the image texture. Additional constraints specify that shale has to be adjacent to sandstone, and sandstone has to be within 10 feet from siltstone. This query is actually a sub-query in a much larger context, as shown in FIG. 6, where information existing in multiple modalities needs to be combined. In this case, the data relating to the borehole of an oil/gas well 601 includes:

(1) well log 602, which is a single-dimensional series capturing parameters such as Gamma ray, proton density, neutron density, etc.;

(2) core photos 603, which are digitized images of the cores extracted from the well (these core photos are taken both under visible light as well as ultraviolet);

(3) FMI 604, which is the 2-dimensional sensor reading of the resistivity/conductivity of the well; and (4) reservoir model 605, which provides a global view of the wells in an area, and how strata goes from one well to another.

Previously, IBM Corporation's Garlic project proposed to use wrappers to integrate heterogeneous data sources. This approach is illustrated in FIG. 7. The wrapper provides the necessary schema translation from heterogeneous data sources such as:

(1) image wrapper 705, to access image archive 711 through image store 708;

(2) relational wrapper 706, to access relational tables 712 through relational DBMS 709; and (3) document wrapper 707, to access document archives 713 through document store 710.

The global Garlic schema is integrated by the object-oriented middleware 703, which has the responsibility of optimizing the query from either the query/browse tool 701 or C++ API 702 against the global schema stored in a meta-data store 704. "OO" SQL refers to Object-Oriented SQL. This paradigm is fairly limited by its capability to be extended to accommodate hybrid fuzzy and precise queries. Each new query capability involves the revision of an optimization module for the global schema.

As opposed to extending query capability through Garlic-like structures, which integrates individual database management systems with an integrating database management system, the current object-relational approach extends the query capability through extension modules such as IBM DB2 extenders, Oracle data cartridges, or Informix datablades.

SUMMARY OF THE INVENTION

The present invention is directed toward techniques for providing a multi-tier object-relational database architecture. In one illustrative embodiment of the present invention, a multi-tier database architecture comprises an object-relational database engine as a top tier, one or more domain-specific extension modules as a bottom tier, and one or more universal extension modules as a middle tier. The individual extension modules of the bottom tier operationally connect with the one or more universal extension modules which, themselves, operationally connect with the database engine. The domain-specific extension modules may preferably provide such functions as search, index, and retrieval services of images, video, audio, time series, web pages, text, XML, spatial data, etc. The domain-specific extension modules may include one or more IBM DB2 extenders, Oracle data cartridges and/or Informix datablades, although other domain-specific extension modules may be used.

The one or more universal extension modules of the present invention may each perform the following functions:

(1) Query parsing: Those sub-queries that need to be handled by a universal extension module are embedded within user-defined functions and passed to a universal extension module. These sub-queries are then parsed by a query parser of a universal extension module. The result is then passed onto a query optimizer of a universal extension module.

(2) Query optimization: A query optimizer within a universal extension module performs a query optimization. As will be explained herein, the query optimizer of the invention is better able to perform query optimization than is otherwise possible with conventional extenders due to a better understanding on the part of the universal extension module of a data model of underlying data types. In particular, an object-oriented approach is applied to processing multimedia objects. In addition, the cost of processing sub-queries at the extension module can be sent back to a universal database optimizer, through a feedback mechanism, for further enhancing global query optimization, if necessary.

(3) Dispatch sub-queries to domain-specific extension modules. The sub-queries that are optimized by the query optimizer are dispatched to those domain-specific extension modules which have been registered with a universal extension module.

(4) Combine query results from those domain-specific extension modules connecting to a universal extension module, and return the query results to the database engine or another universal extension module that invoked the current extension module.

The hierarchical decomposition of the query optimization functions allows universal extension modules to perform more comprehensive query optimization regarding queries related to multimedia objects, without having to revise the object-relational query engine.

In one embodiment, an application programming interface (API) of a universal extension module according to the present invention may be a "plug-and-play" interface and may be implemented through a "self-describing" mechanism based on XML. The software code (e.g., glue) between a universal extension module and domain-specific extension modules which handles specific data types is synthesized automatically, thus greatly simplifying the task of adapting an existing search engine to a given object-relational database.

Plug-and-play capability for the universal extension module of the invention is similar to the concept of plug-and-play in the context of a personal computer. In the case of a personal computer, plug-and-play involves: (1) identifying the device that is connected (e.g., printer, CDROM, modem, etc.) and the port or slot it is connected to; (2) based on the information, determining and allocating the necessary resource (e.g., interrupt, I/O, memory, etc.); and (3) if this is a first use, then locating appropriate drivers from the driver library, then installing the required drivers. Plug-and-play for the universal extension module of the invention is similar. Whenever there is a new search engine that needs to be plugged in to the database as an extender, the search engine is identified, necessary resources (e.g., memory) are allocated, and then the interface is registered so that the search engine is known and can be invoked within the database.

It is to be appreciated that in order for an extension module to be plug-and-play, the extension module should describe the query language or API that the module accepts, the location of the index, if any, and the structure of the return results.

The term "self-describing," as used above, refers to the concept that there exists meta-data which describes the nature of the data. The meta-data may include the schema and semantics of the database.

Thus, as will be explained in detail herein, the present invention provides an extensible structure for software modules that can be used to construct an object-oriented extension of a relational database. Further, the invention provides a method for automatic synthesis of extender wrappers from existing software modules. Still further, the inventive hierarchical architecture for constructing extension modules provides advanced non-relational query processing capabilities.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 4 illustrates both precise and fuzzy queries for join, logical composition, spatial composition, and temporal composition;

FIGS. 9A and 9B show the DB2 text extender commands for server and clients, respectively;

FIGS. 10A and 10B show the DB2 text extender user-defined datatypes and user-defined functions, respectively;

FIG. 11 shows the DB2 text extender programming API;

FIG. 12 shows the tables before and after a column has been enabled for a text extender;

FIG. 14 shows the code example for using a text extender;

FIGS. 16A and 16B show user-defined datatypes and user-defined functions for an image extender;

FIG. 17 shows the code examples of using image extenders;

FIG. 18 illustrates a framework for a universal extension module according to one embodiment of the present invention;

DETAILED DESCRIPTION OF PREFERRED EMBODIMENTS

As will be explained in detail below, the present invention provides the following: (1) an extensible structure for software modules that can be used to construct an object-oriented extension of a relational database; (2) a method for automatic synthesis of extender wrappers from existing software modules; and (3) a hierarchical architecture for constructing extension modules to provide advanced non-relational query processing capabilities.

It is to be appreciated that in the following detailed description, a preferred embodiment will be presented using the IBM Corporation database DB2 as an example. Although the DB2 extender structure, which is illustrated in FIG. 8, is used in this invention, it is to be understood that the principles of the present invention can be applied to any other object-relational databases such as those from Oracle and Informix, to name a few.

Figure 8:
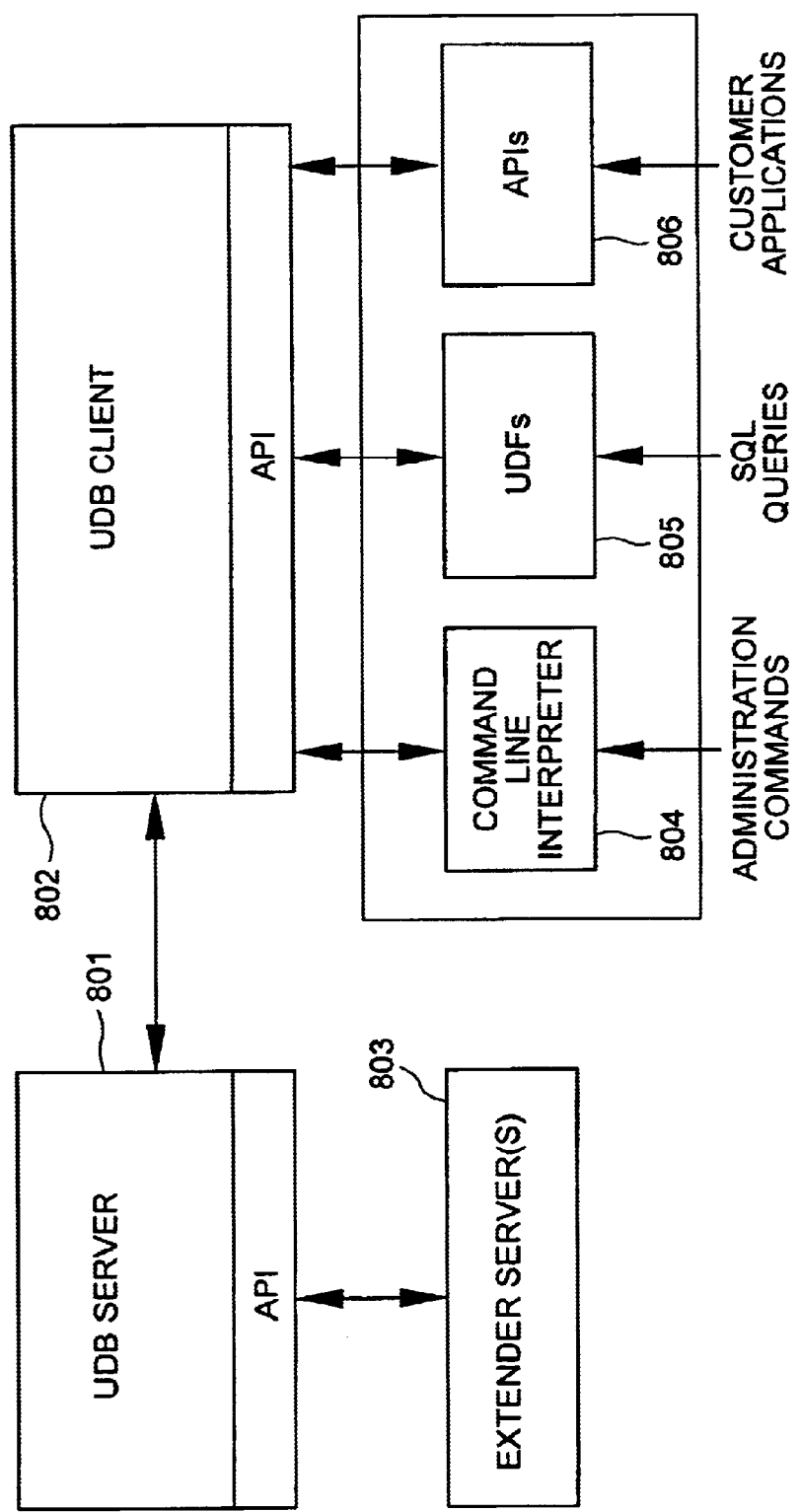
FIG. 8 illustrates the client server structure for the IBM Corporation DB2/UDB.

FIGS. 8–17 illustrate architecture and coding examples associated with using DB2 extenders. As illustrated in FIG. 8, the server side comprises a Universal Database (UDB) server computer system 801 connecting through an API to one or more extender servers 803. The client side comprises a UDB client computer system 802, which can interface with a human being or application programs through the following three approaches:

(1) Command line interpreter 804, which accepts administration commands;

(2) UDFs 805, which accept SQL queries with UDF extensions; and (3) Application Programming Interfaces—APIs 806, which can be invoked by customer applications.

Using the DB2 extender as an example, DB2 V7.1 is currently providing text, multimedia, spatial, and XML extenders.

For the text extender case, all of the available commands for both the DB2 text extender server and the text extender client that can be interpreted by the command line interpreter (804 in FIG. 8) are listed in FIGS. 9A (server) and 9B (client). The client side commands include functions such as "connect to extender server" (connect), "enable text table" (enable text table), and "enable text column" (enable text column). The server side commands include functions such as "create a text extender instance" (TXICRT), "add text extender server" (TXNADD), and "start the text extender services" (TXSTART). The user-defined data types (UDTs) and user-defined functions (UDFs) (described in 805 in FIG. 8) are shown in FIGS. 10A (UDTs) and 10B (UDFs). UDTs defined for the text extender include DB2TEXTH, DB2TEXTFH, DB2TEXTHLISTP, and DB2TEXTFHLISTP. UDFs include CONTAINS, FILE, FORMAT, NO_OF_DOCUMENTS, etc. These UDTs and UDFs can be used in a SQL query (an example is shown and explained in FIG. 14). The programming API that can be directly embedded in a C or C++ program as subroutine calls is shown in FIG. 11.

An example of extending a pure relational table with the use of the text extender UDT is shown in FIG. 12. The original table 1201 contains attributes such as document identifier (DOCID) and Comment. The enhanced table 1202 with the use of a DB2 text extender adds one more attribute, Comment Handle, which contains: (1) a document ID; (2) the name and location of the associated index; and (3) the document information: coded character set ID (CCSID), format, and language.

Figure 13:
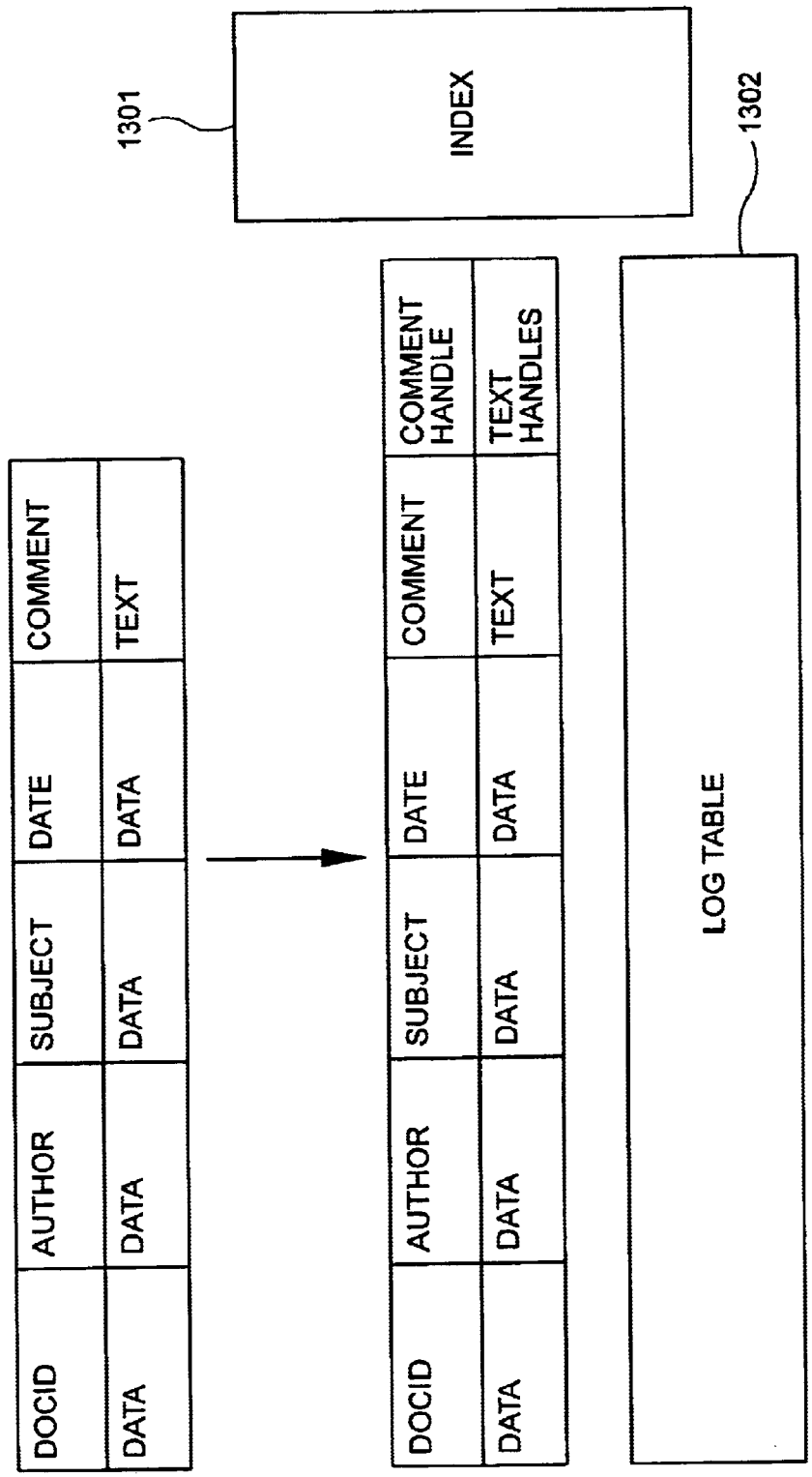
FIG. 13 shows the text column enabling process.

This enhanced table is created using the command "ENABLE TEXT COLUMN." In addition to the additional comment handle column, two additional tables are created (as shown in FIG. 13): (1) Index 1301: an index for the text column is created when ENABLE TEXT COLUMN is invoked; and (2) Log table 1302: the log table is used to record changes to the text column, that is, inserts, updates and deletions. Insert, update, and delete triggers are defined for the text column to keep the log table up to date automatically.

Two code samples using text extenders are shown in FIG. 14. The first part 1401 prints out a list of dates and subjects of documents containing the comment "compress." Note that DB2TX.CONTAINS is a UDF call. The second part 1402 generates an intermediate result, TEMPTABLE, which comprises three attributes, DATE, SUBJECT, and MATCHES. The first sub-query builds the temporary table so that each row contains the following attributes from a document: date, subject, and number of times that "compress" appears in the document. The second sub-query selects those rows where MATCHES are greater than zero. The UDF used in the second query is DB2X.NO_OF_MATCHES. These two queries will generate identical results.

Figure 15:
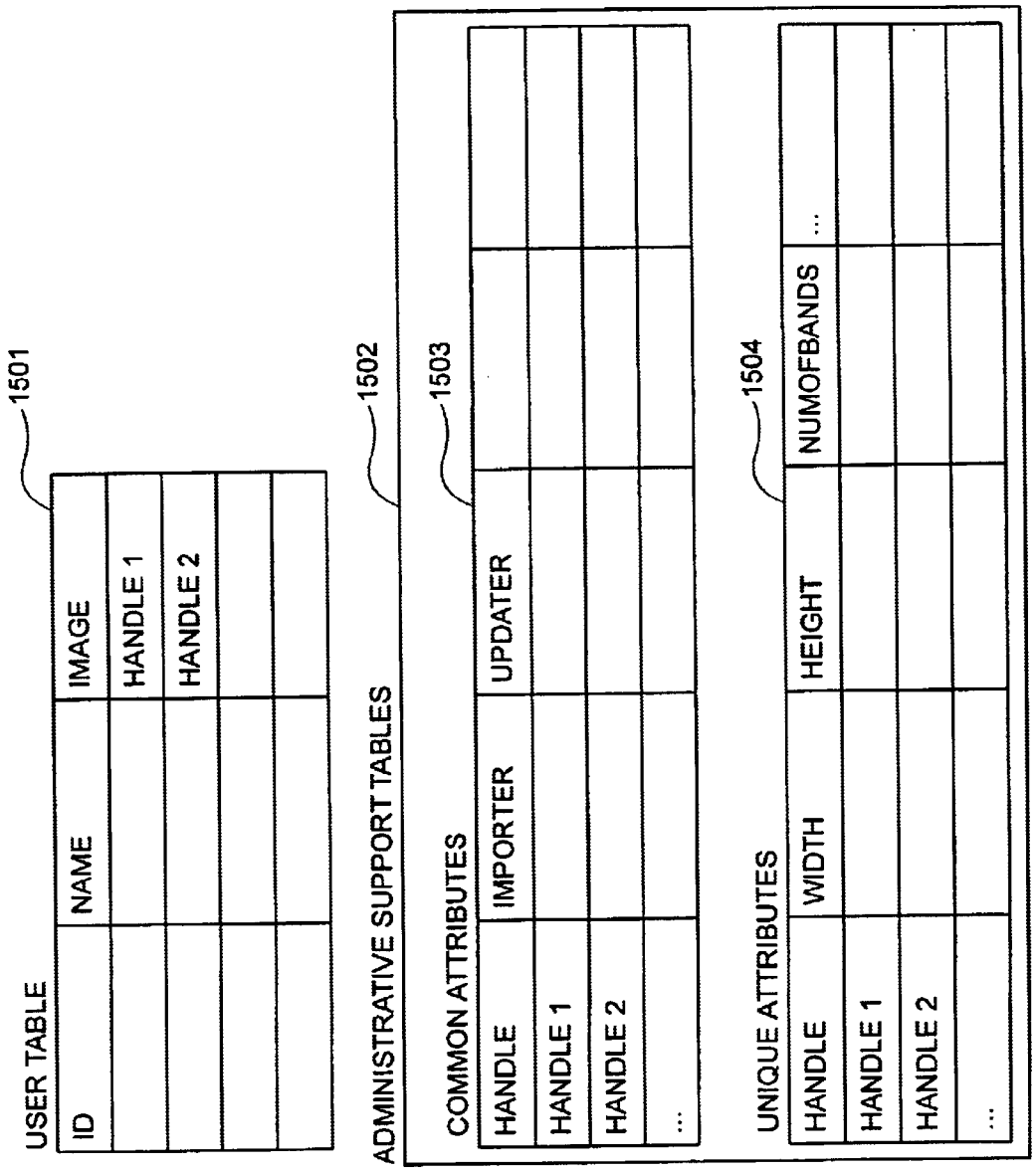
FIG. 15 shows the administrative tables for enabling a user table with an image extender.

FIG. 15 illustrates the process of extending a regular table with an image extender. In this case, the user table 1501 originally contains ID and NAME as attributes. When a column is created for storing images based on the image extender UDT, the image is not stored in the user table. Instead, a handle (which is actually a character string) is created and stored in the user table (Handle 1, Handle 2). The extender stores the object in administrative support tables 1502, or stores a file identifier in the administrative support tables 1502, if the content of the object is in a file. The extender also stores the object's attributes and handle in the administrative support tables 1502. In this way, the extender can link the handle stored in a user table with the object information stored in the administrative support tables. Within the administrative tables, common attributes (independent of media type) such as importer and updater are stored in a first administrative support table 1503, while the other media-specific attributes such as width, height, number of bands are stored in a second administrative support table 1504.

A list of UDTs and UDFs for multimedia extenders (image, video, and audio) are shown in FIGS. 16A and 16B, respectively. Code samples of using these user-defined functions are illustrated in FIG. 17. The first example 1701 illustrates the process of specifying the data source ("/tmp/img.gif" in this case) for a color histogram feature. The second example 1702 illustrates the process of a search through a source defined by an "employee," and on the images defined by "qHandle."

FIG. 18 illustrates a framework for a universal extension module according to one embodiment of the present invention. In general, the universal extension module framework 1800 comprises four components:

(1) Data type 1801: This can be, for example, text, image, video, XML, geo-spatial data, etc.;

(2) Data model 1802: This is the description of the aggregation of, for example, text tokens, features, regions, segments, scenes, shots, etc.;

(3) Transformation methods 1803: These methods are used to perform feature extraction from data, transforming from one format to the other, such as, for example, from JPEG (Joint Photographic Expert Group) to GIF (Graphic Interchange Format), or from AVI (Audio Video Interleave) to MPEG (Moving Picture Expert Group—MPEG-1, MPEG-2 and MPEG-4); and (4) Access methods 1804: Access methods are used for accessing the data, such as, for example, "top K results that are similar to . . . ", etc.

Figure 1:
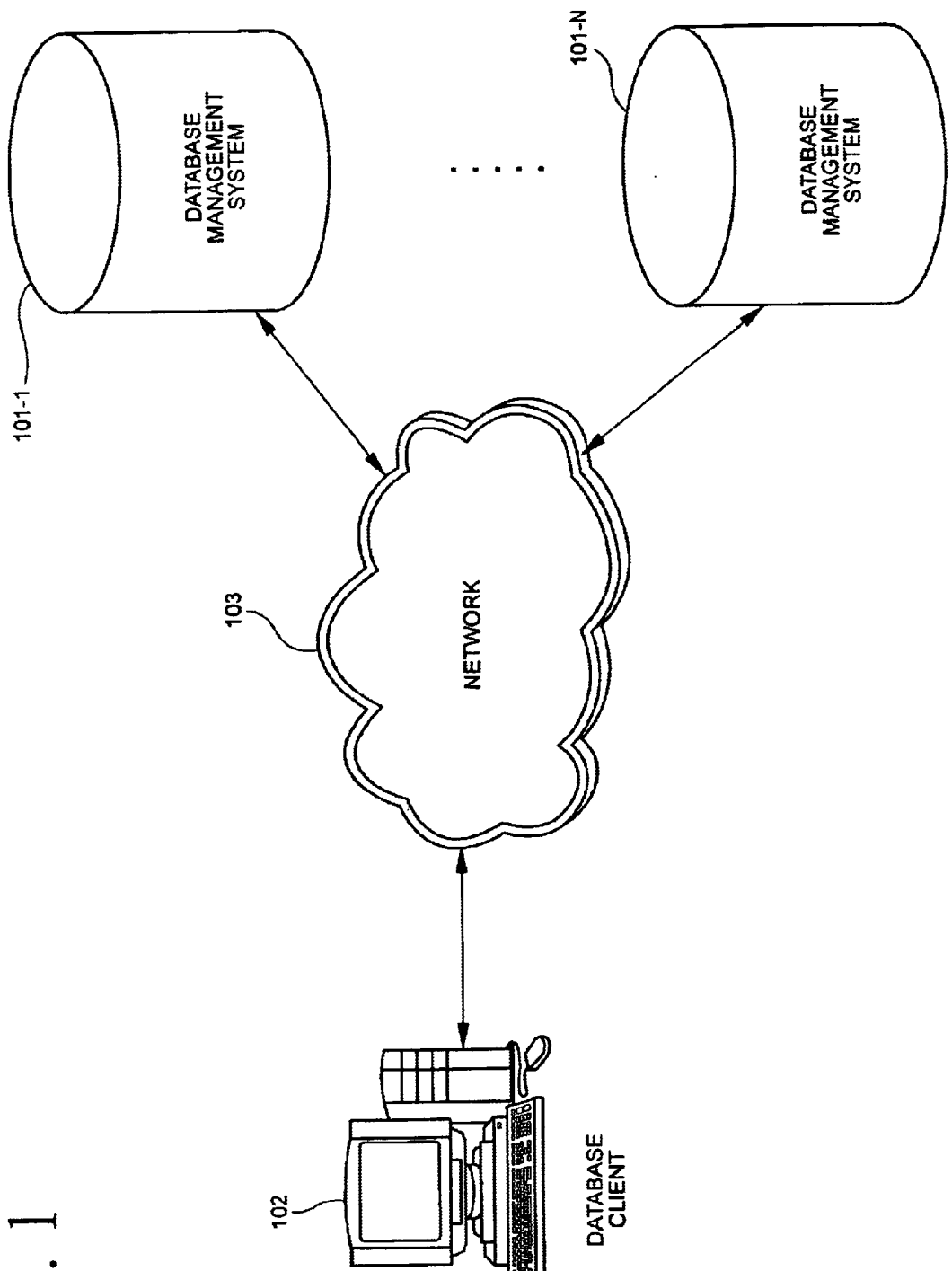
FIG. 1 is a block diagram illustrating a database client connecting to one or more database management systems through a network.
Figure 2:
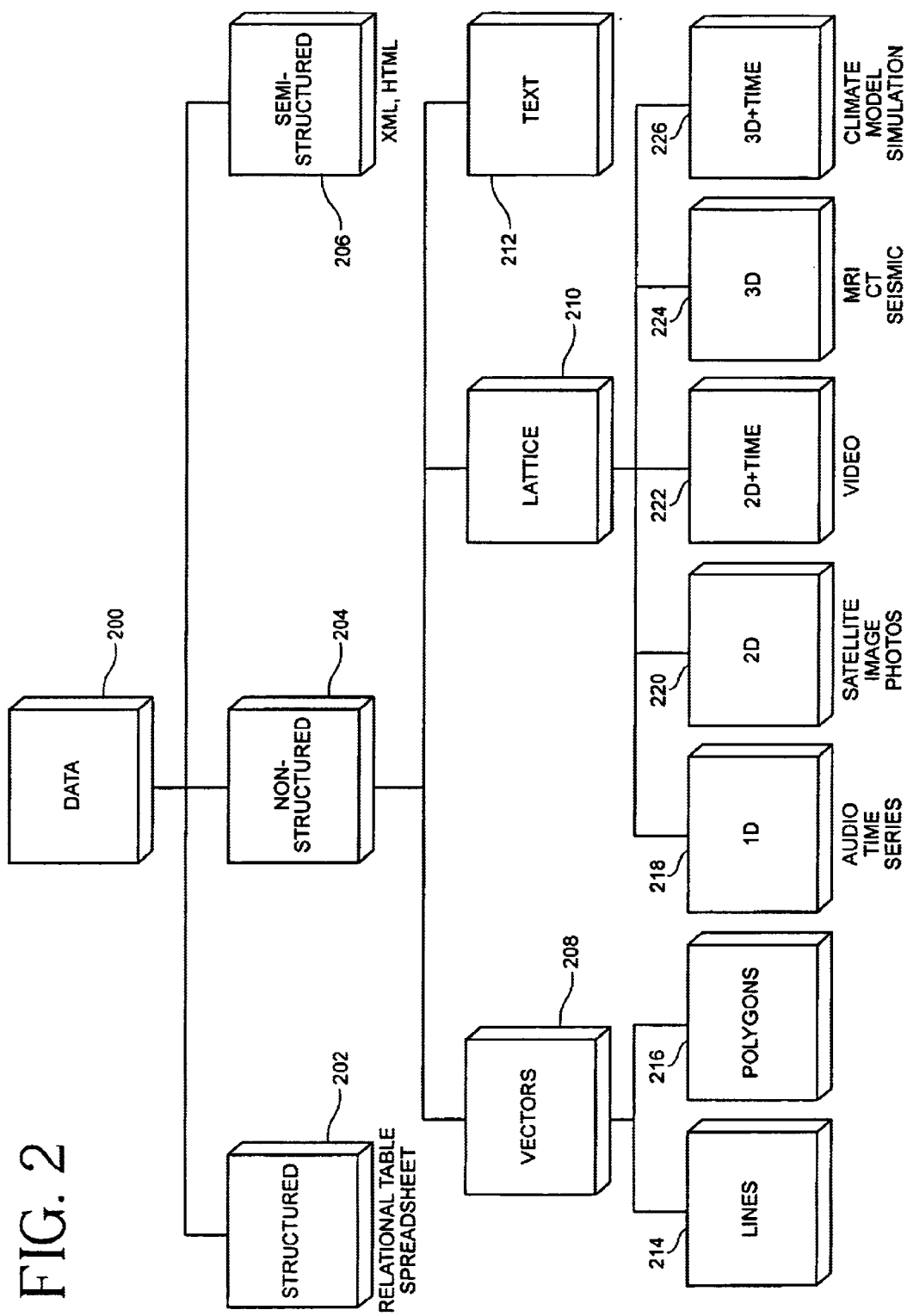
FIG. 2 is a taxonomy of different data types that may need to be managed (search and retrieval) by a database management system.
Figure 3:
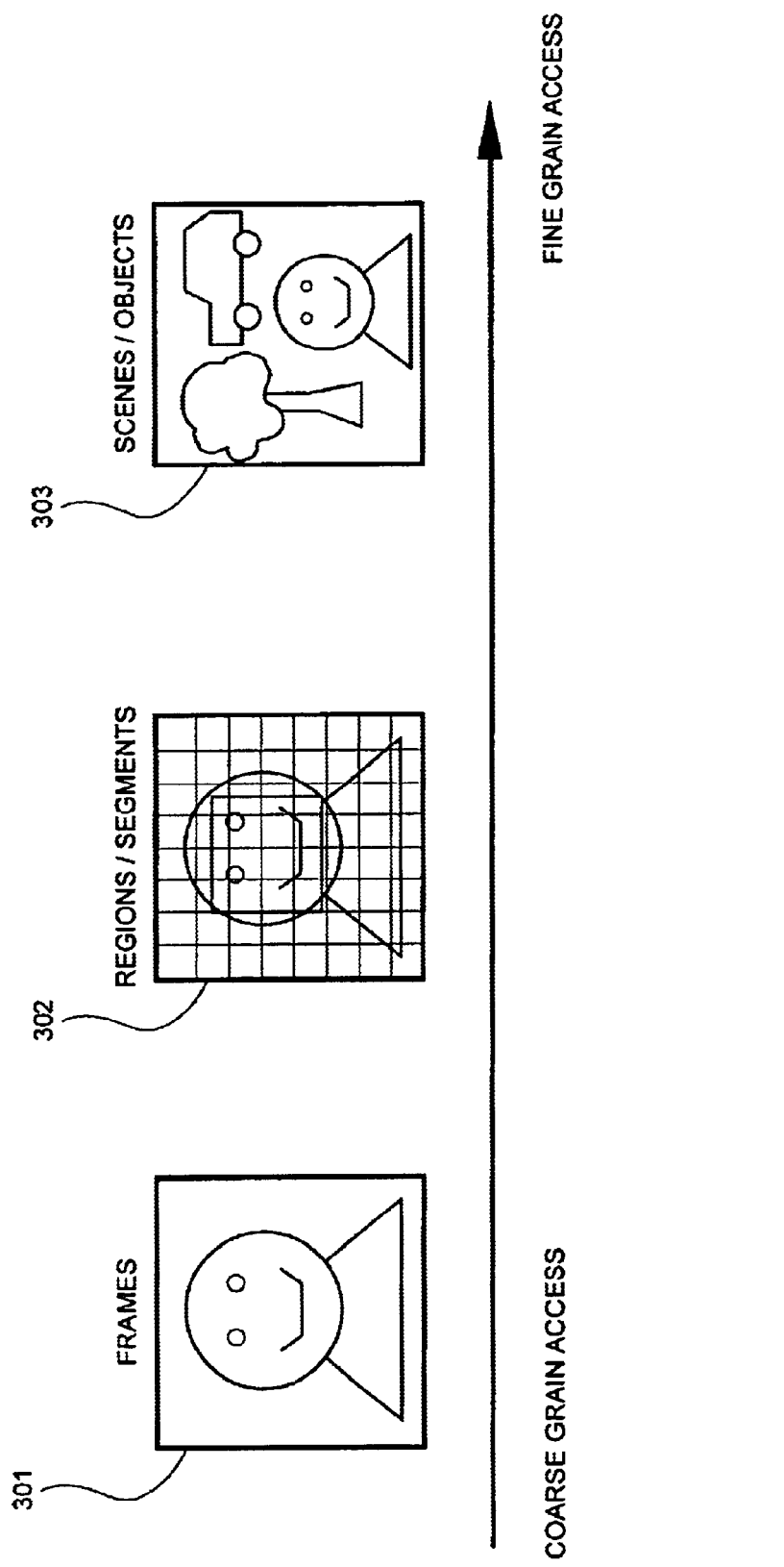
FIG. 3 illustrates access granularity for different scenarios.
Figure 5:
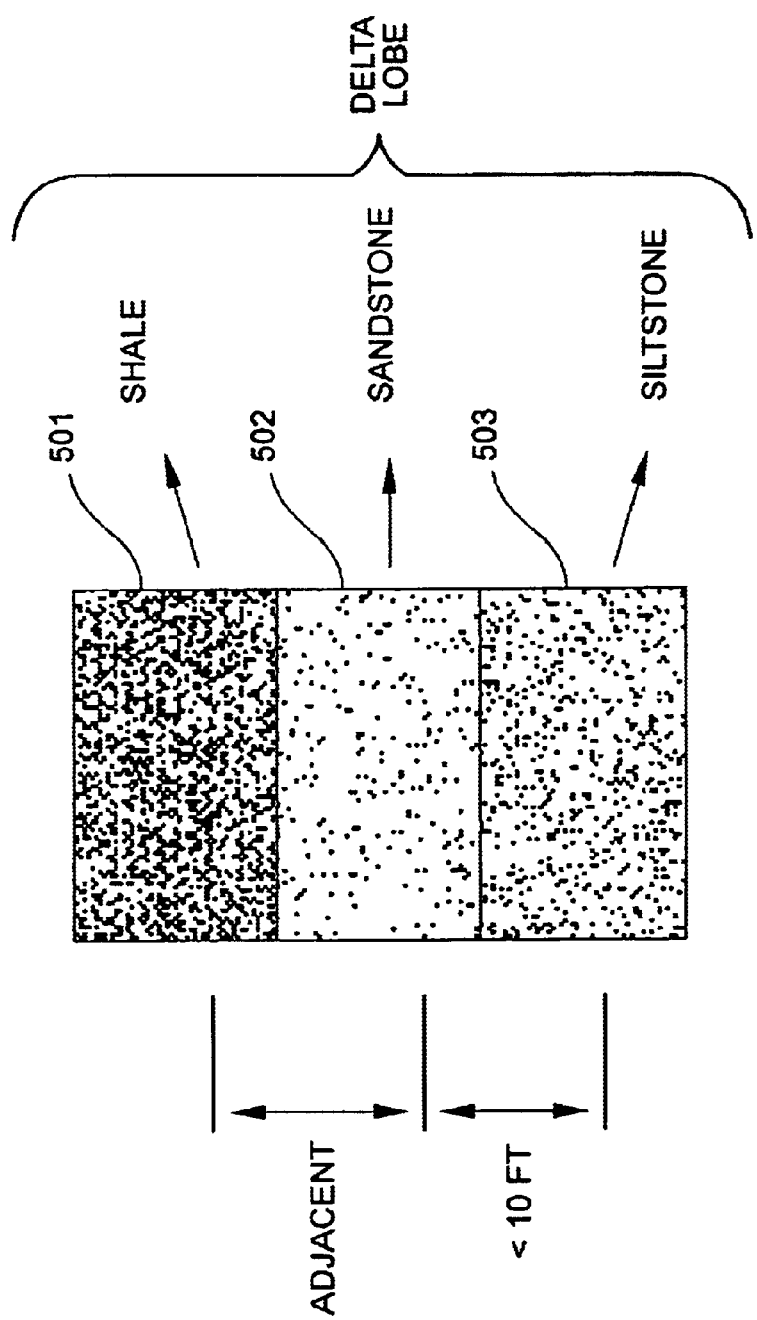
FIG. 5 illustrates a scenario which requires spatial composition of multiple regions, each of which is defined in terms of image features.
Figure 6:
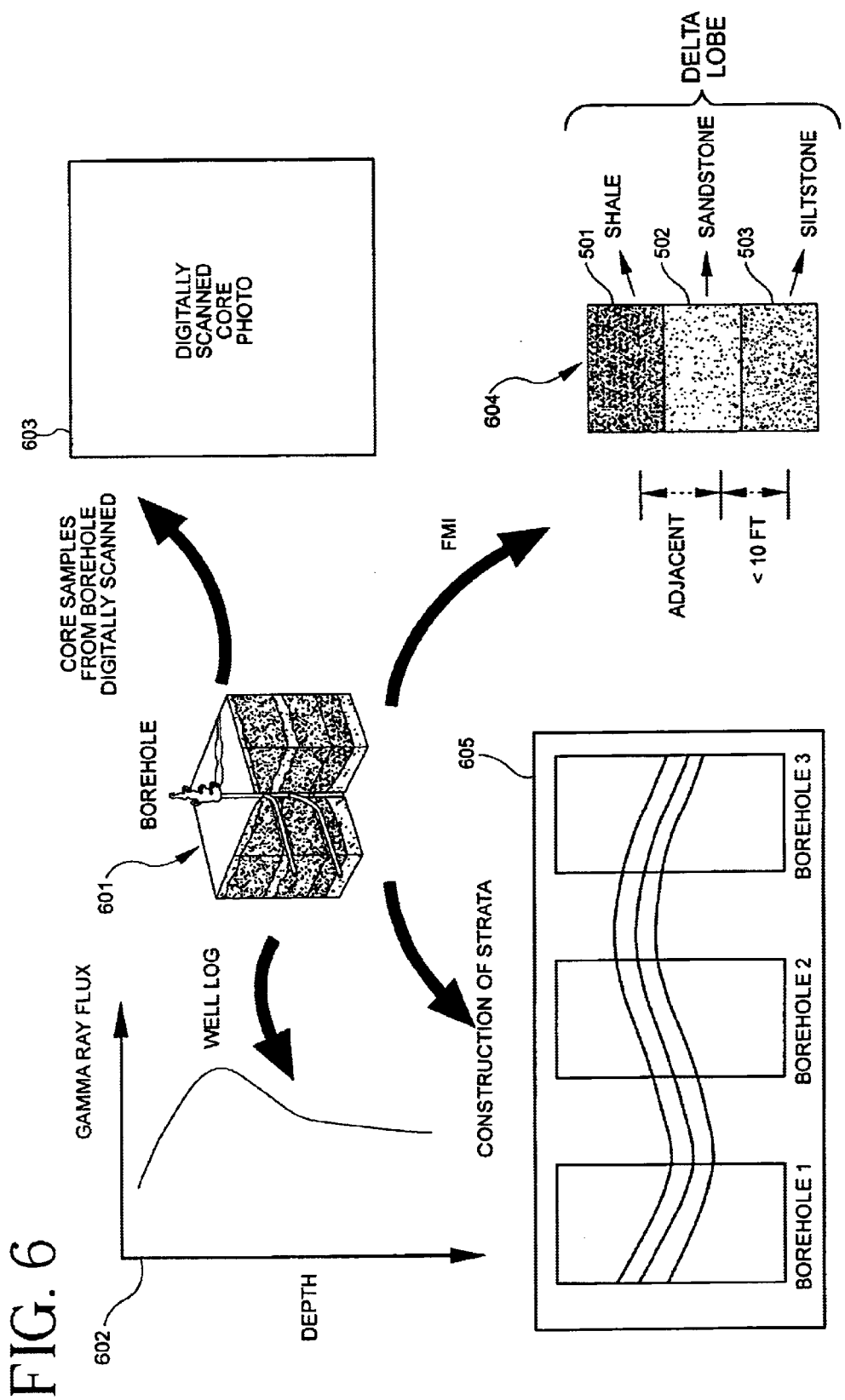
FIG. 6 illustrates a case where multiple modalities of data (core images, FMI data, well log data) need to be searched and fused to construct a reservoir model.
Figure 7:
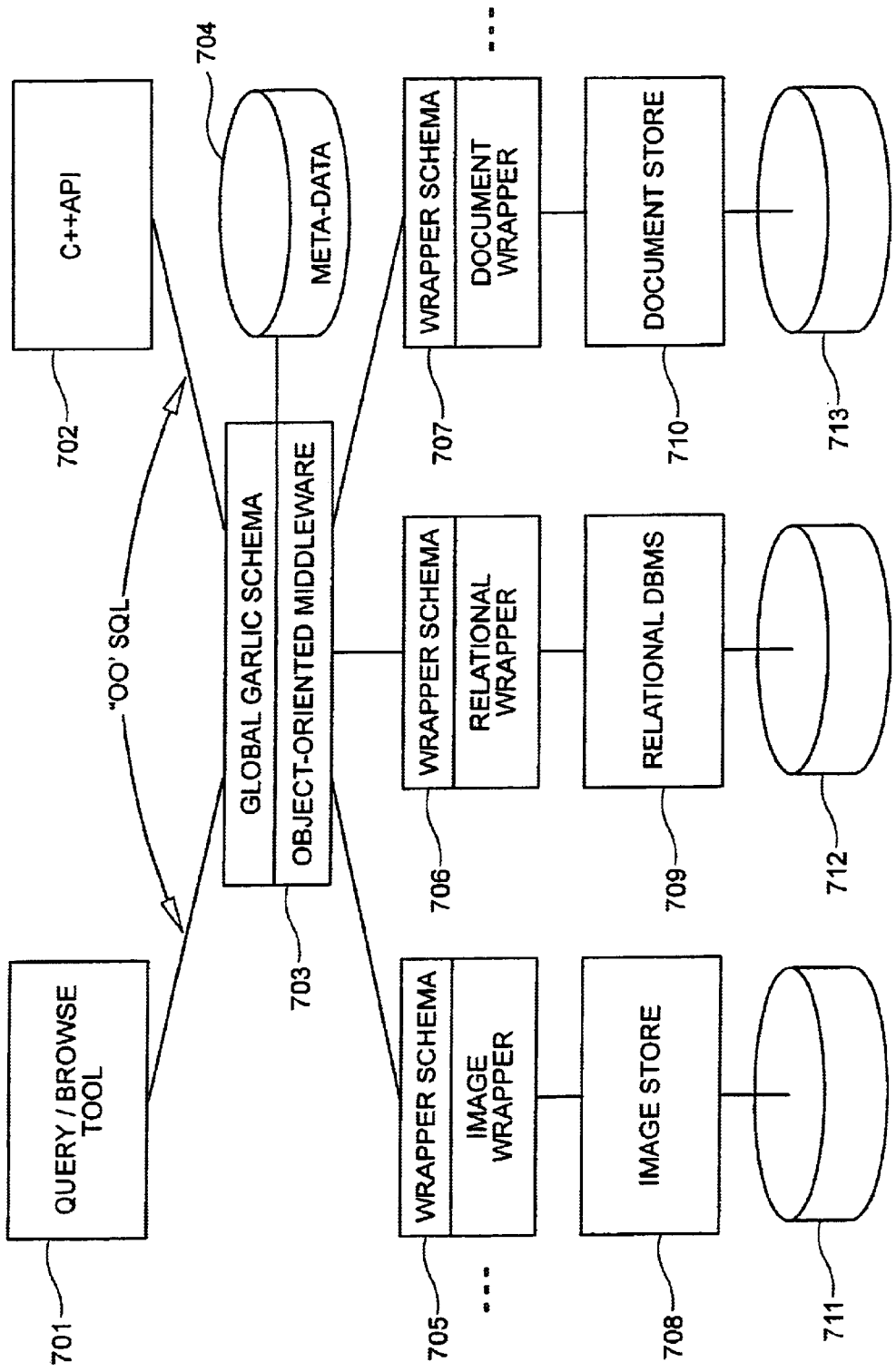
FIG. 7 illustrates the IBM Corporation Garlic approach for accessing heterogeneous data sources through wrappers.
Figure 19:
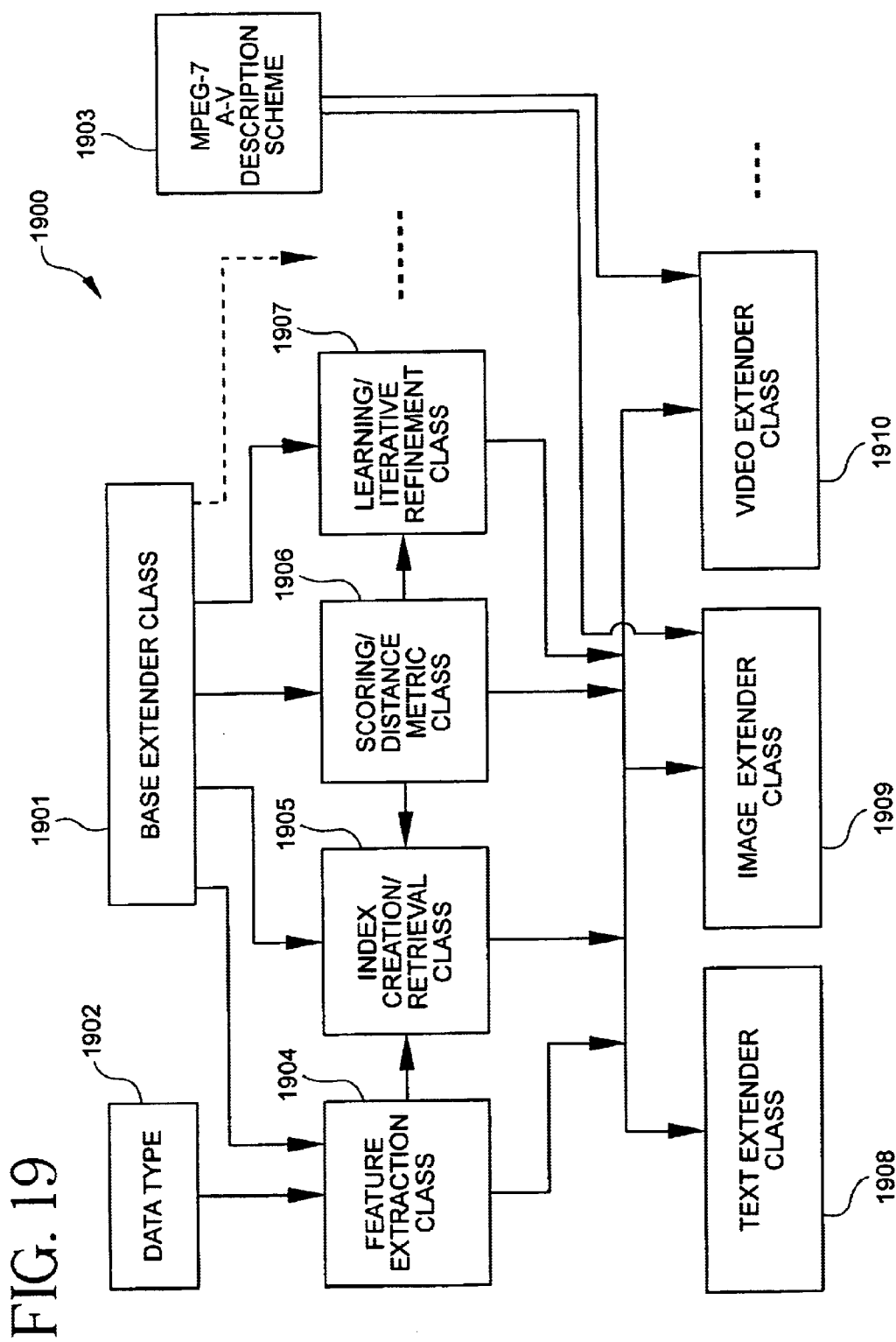
FIG. 19 shows the class hierarchy for subclassing a base extender class into various extenders.

In a first aspect, the present invention comprises a framework and method comprising a class hierarchy so that maximal infrastructure and modules can be shared among different extension modules. The class hierarchy 1900 (in the object-oriented programming sense) of the universal extension module framework is illustrated in FIG. 19. Many extenders for providing accessing capabilities of various data modalities (as shown in FIG. 2) could potentially share many infrastructures such as feature extraction, index generation and measure of similarity (distance metric for results evaluation). However, all of the existing extenders, data cartridges or datablades are constructed independently of each other, and thus have very little sharing of infrastructure. Consequently, establishing a class hierarchy common to all extenders and search engines allows the components in the domain-specific extenders to be more sharable. In other words, the universal extension module framework, based on the class hierarchy, provides the foundation for building other extenders.

Identifying key components for building this class hierarchy, however, is not straightforward. The challenges include a deeper understanding regarding the decomposition of the functionality of the extenders. From the basic extender class 1901, key components of the extender class that involve search and retrieval of one data modality (as defined in FIG. 2) include: (1) feature extraction class 1904; (2) index creation/retrieval class 1905; (3) scoring/distance metric class 1906; and (4) learning/iterative refinement class 1907; etc.

These classes are also interrelated, and will be further explained in the context of the next few figures. Additional information such as the data types 1902 and the data models 1903 (such as those defined by MPEG-7 AV (audio-visual) description scheme) can then be used in conjunction with these basic classes to construct a text extender class 1908, an image extender class 1909, a video extender class 1910, etc.

Figure 20:
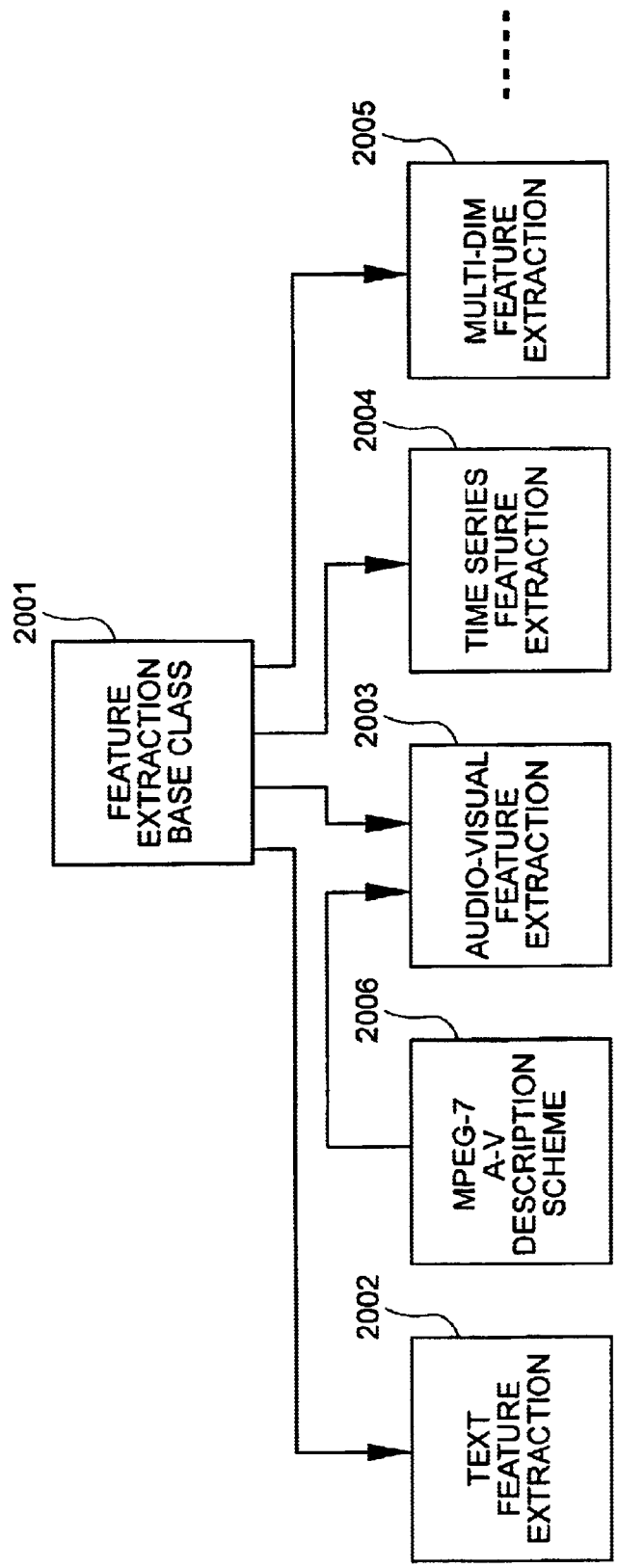
FIG. 20 shows the process of extending the base feature extraction class with the MPEG-7 description scheme into an audio-visual feature extraction class.

FIGS. 20–28 give a detailed illustration of the process of constructing a audio-visual feature extraction module according to an embodiment of the present invention. Starting from the feature extraction base class 2001, as shown in FIG. 20, feature extraction classes for text data 2002, audio-visual data 2003, time-series data 2004, and multi-dimensional data 2005 can be included in the feature extraction module of the universal extension module.

The following description goes through the process of defining the audio-visual feature extraction module from the feature extraction base class using data models (such as those defined by the MPEG-7 Audiovisual description scheme 2006). Assuming that S represents the data, and M represents the data model of the features that are being extracted, the base class for the feature extraction can be defined as: F=Extract(S,M): this class extracts the features F based on the data model M from the data set S. Note that this class can be defined recursively, so that features can be extracted from features.

The data (as defined in FIG. 2) can be one-dimensional (such as time-series or audio), two-dimensional (images), two-dimensional plus time (video, image sequence), or three-dimensional (seismic, MRI, CT). The features can include low level features (such as texture, color histogram, or shape for images; slope for one-dimensional signals) or high level features (such as the semantic description of the data).

Based on the data modality, data-specific feature extractions can then be defined, such as time-series feature extraction, audio feature extraction, image feature extraction, video feature extraction, medical image feature extraction, and seismic data feature extraction. For audio-visual feature extraction, the MPEG-7 specification can be used for defining the data models.

Figure 21:
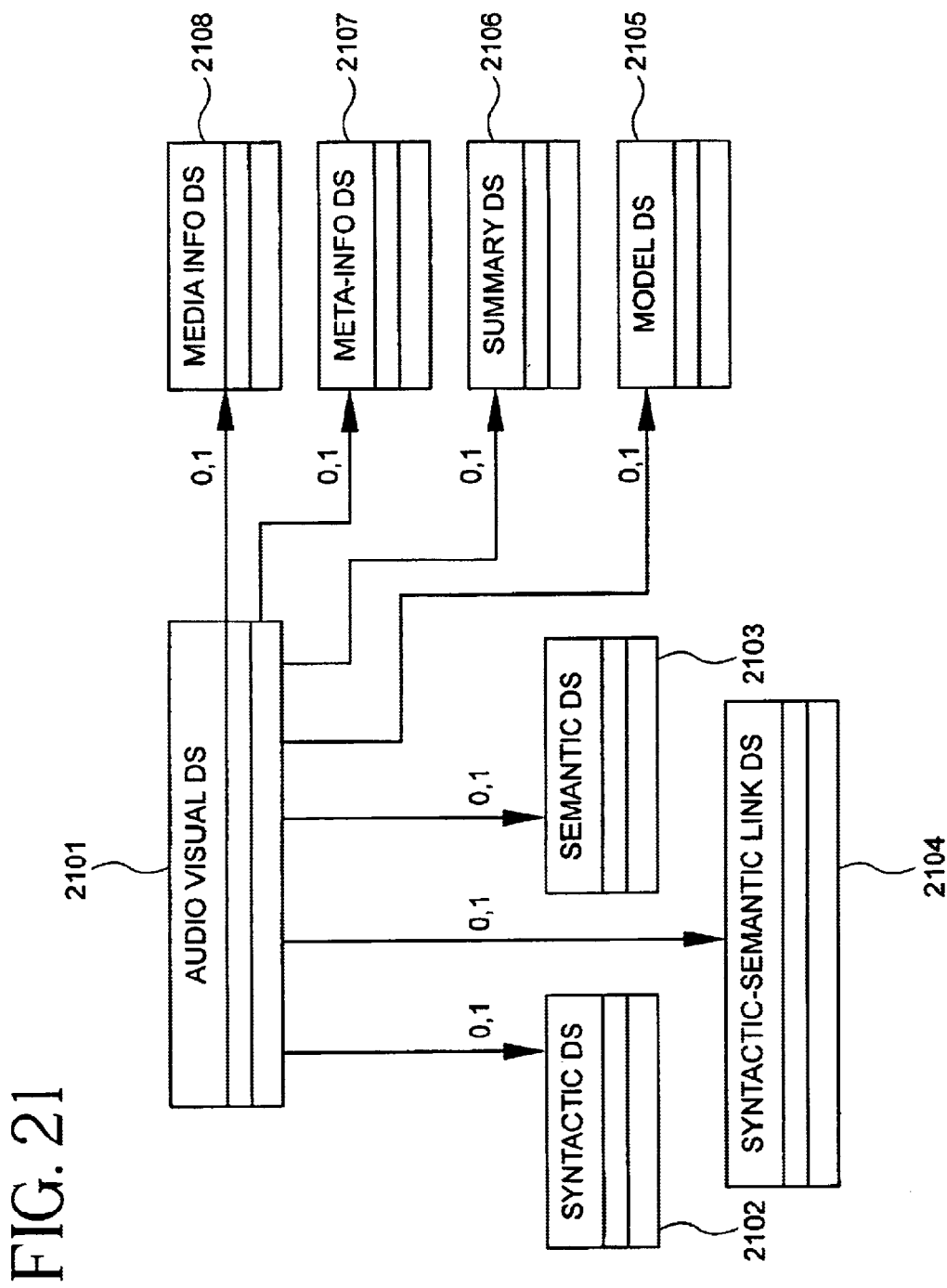
FIG. 21 shows the MPEG-7 audio-visual description scheme.
Figure 22:
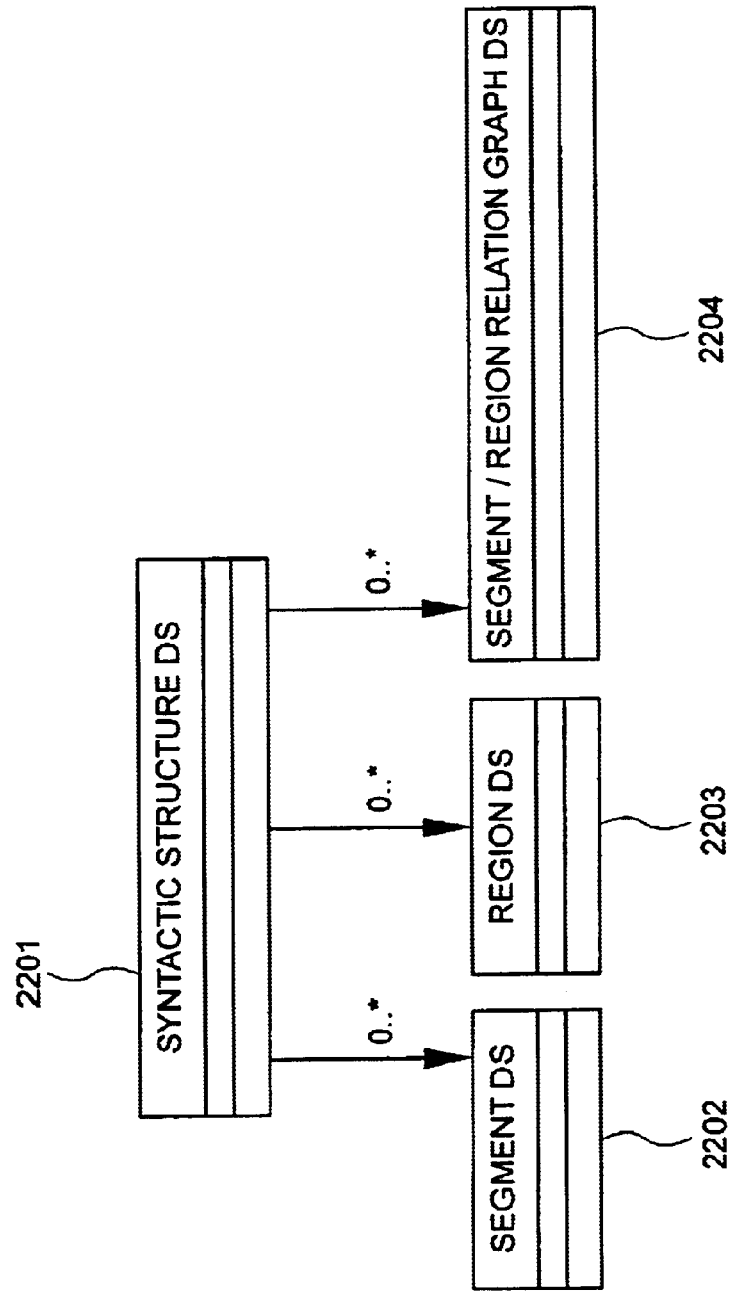
FIG. 22 shows the MPEG-7 syntactic structure description scheme.

The MPEG-7 Audio-Visual Description scheme is described in FIG. 21, which is the data model for defining the meta-data that describes the syntax, semantics, and features inside audio, images and video. Basic components of the MPEG-7 Audio-Visual Description scheme 2101 include syntactic description scheme 2102 (FIG. 22), semantic description scheme 2103 (FIG. 25), syntactic-semantic link description scheme 2104 (FIG. 26), model description scheme 2105, summary description scheme 2106, meta-information description scheme 2107 (FIG. 27), and media information description scheme 2108 (FIG. 28). It is to be appreciated that the 0, 1 and * in FIGS. 21–28 reflect the fact that some of the entities can be related to zero or one of the other entities. Using FIG. 21 as an example, syntactic DS (description scheme) is optional. When it is present, there is no more than one instance. So, it is expressed as 0, 1. The same scenario is applied to the rest of the DS. FIG. 22 indicates a slightly different scenario, in which segment DS is optional, and can have as many instances as needed. In FIG. 24, Entity relation is not optional, and can have one or more instances. On the other hand, relation is required and only one instance is allowed.

FIG. 22 shows the syntactic structure description scheme 2201, which contains a segment description scheme 2202, a region description scheme 2203 (FIG. 23), and a segment/region relation graph description scheme 2204 (FIG. 24) within an image or video sequence. Note that the term "segment" in MPEG-7 is an "abstract" class, which may be used to denote any arbitrary spatial or temporal regions or intervals.

Figure 23:
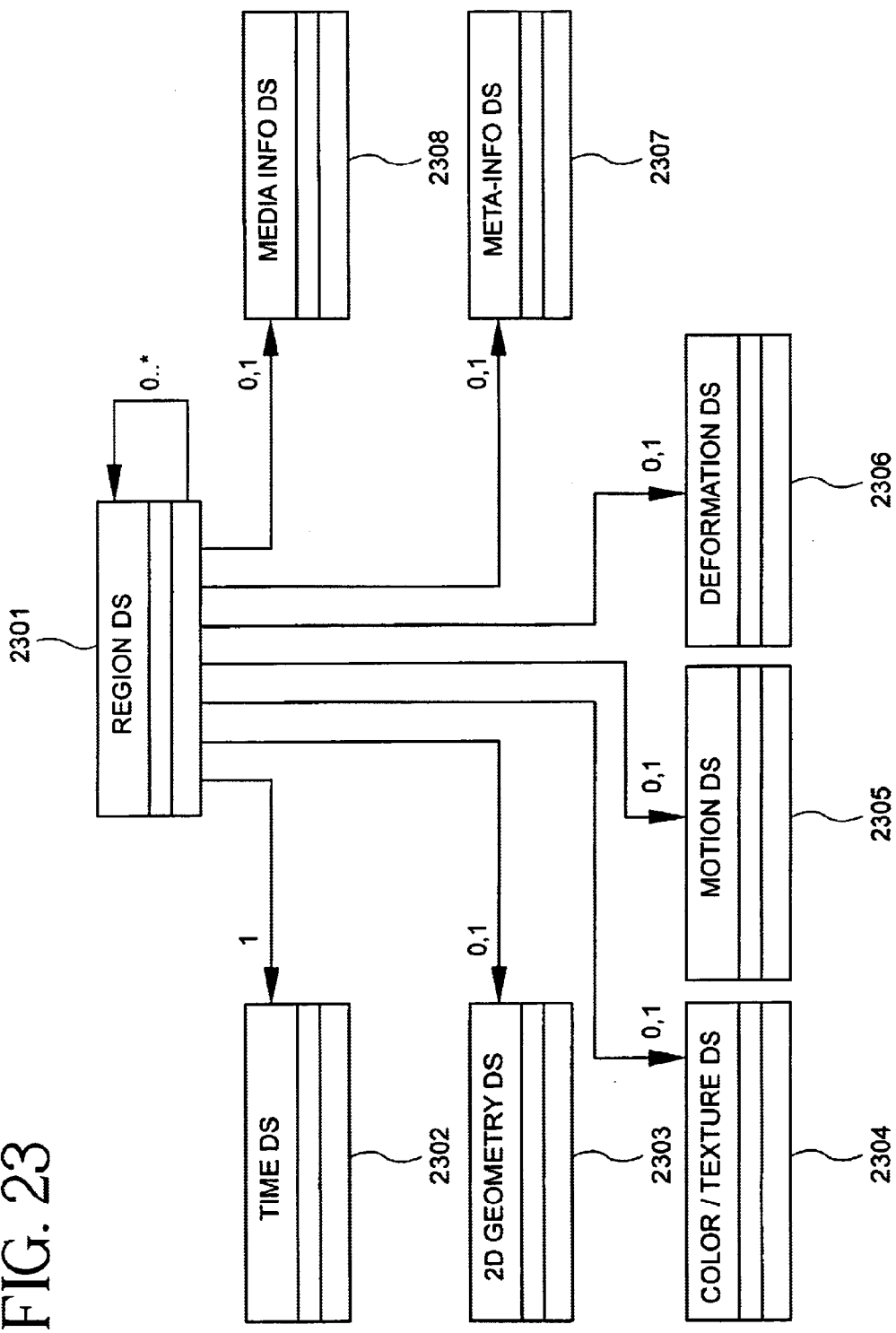
FIG. 23 shows the MPEG-7 region description scheme.
Figure 24:
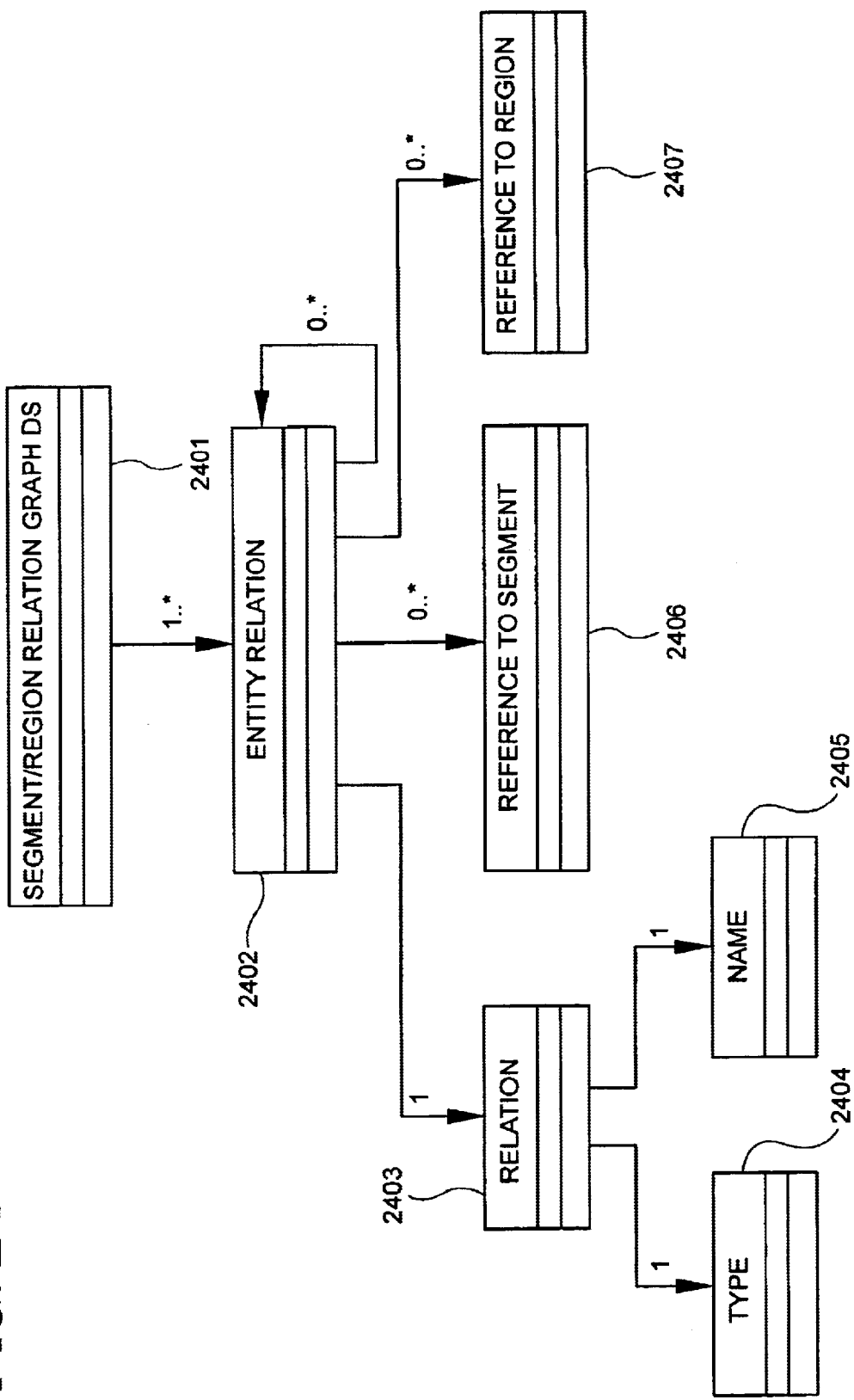
FIG. 24 shows the MPEG-7 segment/region relation graph description scheme.
Figure 27:
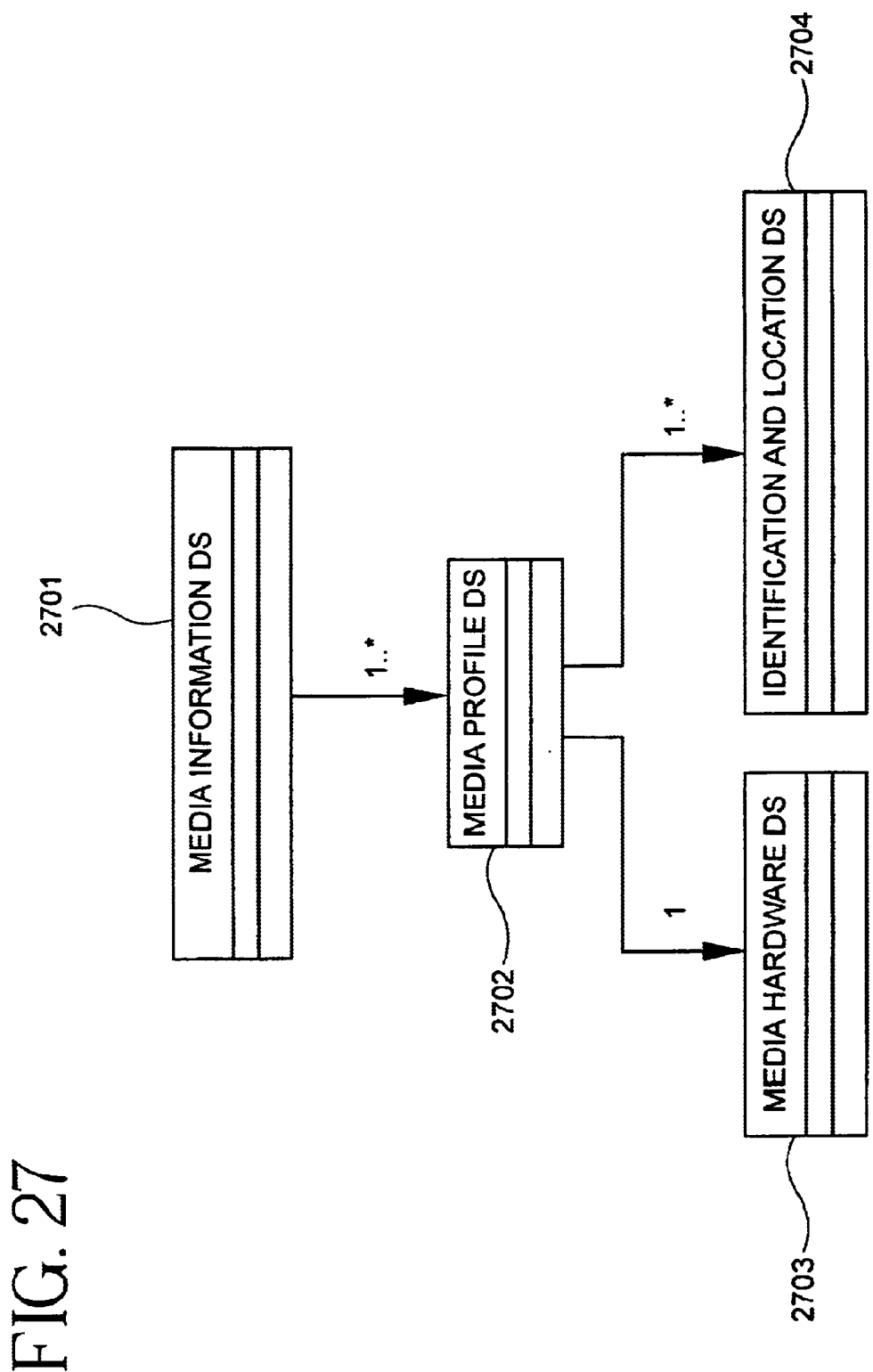
FIG. 27 shows the MPEG-7 media information description scheme.
Figure 28:
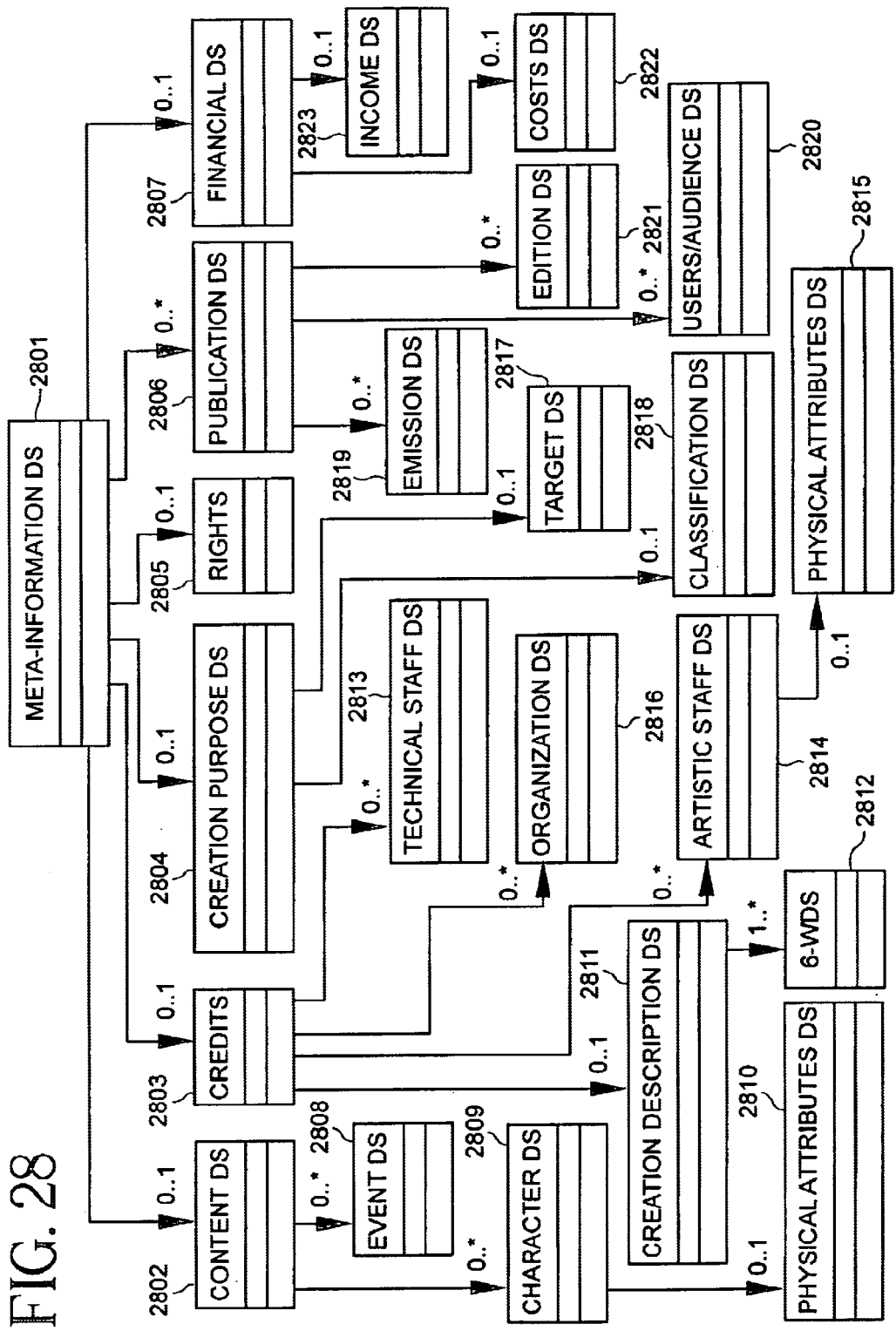
FIG. 28 shows the MPEG-7 meta-information description scheme.

The region description scheme, as shown in FIG. 23 as block 2301, includes a time description scheme 2302, a two-dimensional geometry description scheme 2303, a color/texture description scheme 2304, a motion description scheme 2305 (for video), a deformation description scheme 2306, meta-information description scheme 2307 (further detailed in FIG. 28), and media information description scheme 2308 (further detailed in FIG. 27).

FIG. 24 shows the segment/region relation graph description scheme 2401, which includes an entity relation block 2402. The entity relation block includes a relation block 2403, a reference to segment block 2406, and a reference to region block 2407. As shown, each relation 2403 is defined by a type 2404 and a name 2405.

Figure 25:
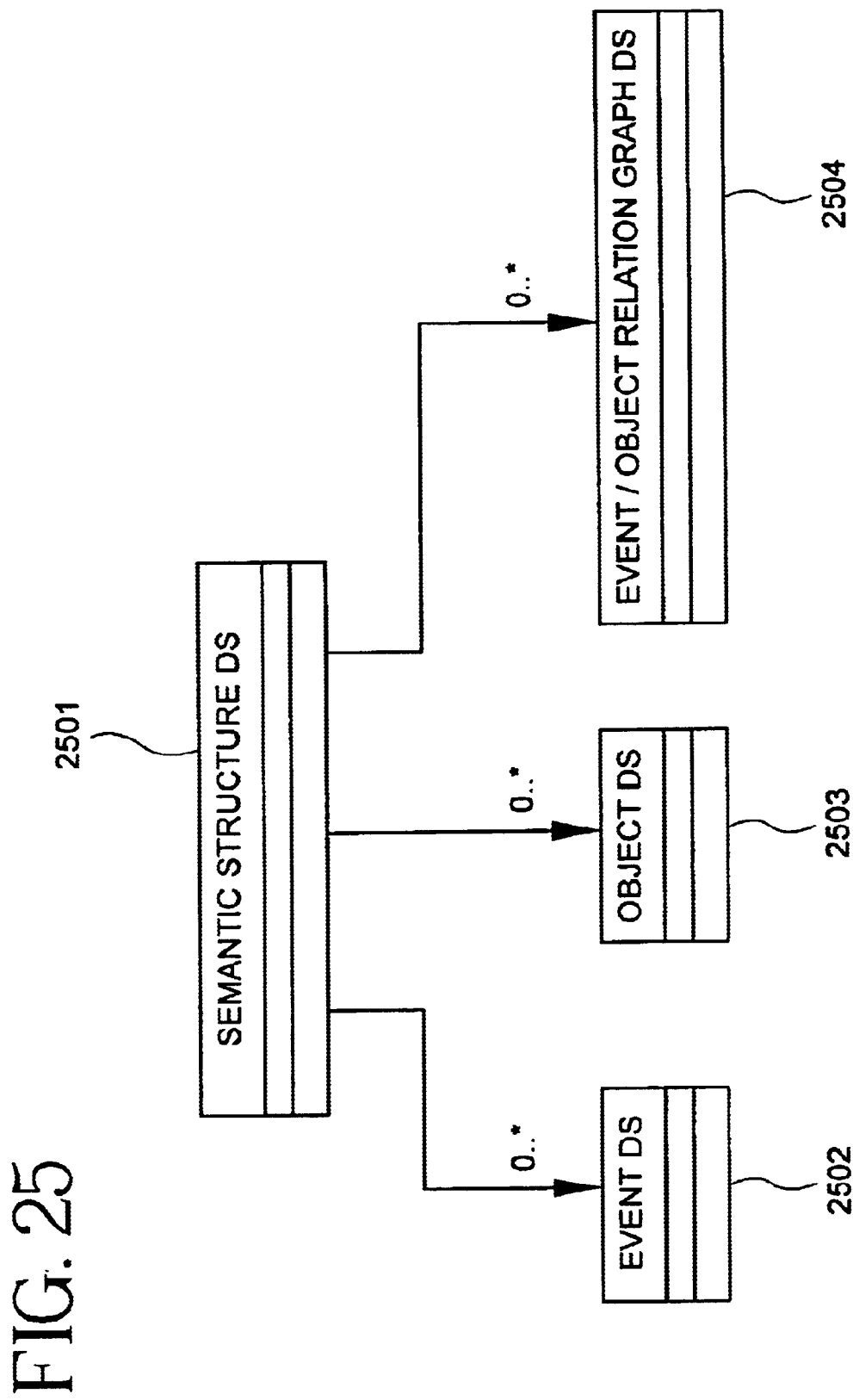
FIG. 25 shows the MPEG-7 semantic structure description scheme.

FIG. 25 describes the semantic description scheme 2501, which comprises an event description scheme 2502, an object description scheme 2503, and an event/object relationship graph description scheme 2504.

Figure 26:
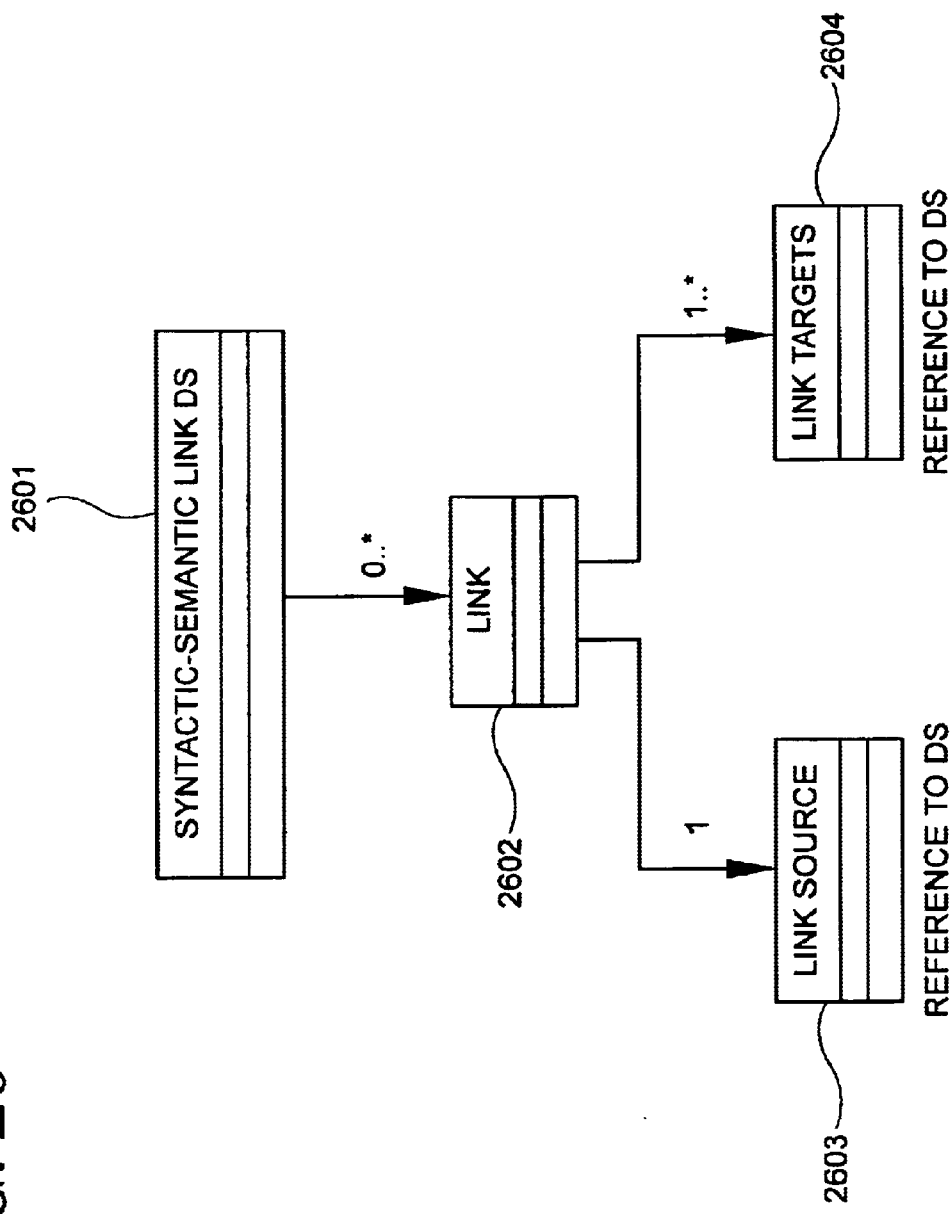
FIG. 26 shows the MPEG-7 syntactic-semantic link description scheme.

The structure for linking the semantics and the syntax of audio-visual data is defined in FIG. 26. As shown, the syntactic-semantic link description scheme 2601 includes links 2602 which include link sources 2603 and link targets 2604.

The media information description scheme 2701, as shown in FIG. 27, includes one or more media profile description schemes 2702, which each include a media hardware description scheme 2703 and an identification/location description scheme 2704.

The meta-information description scheme 2801, as shown in FIG. 28, includes parametric data that is commonly associated with each image or video, including a content description scheme 2802, a credits description scheme 2803, a creation purpose description scheme 2804, a rights description scheme 2805, a publication description scheme 2806, and a financial information description scheme 2807. The content description scheme 2802 includes an event description scheme 2808 and a character description scheme 2809 which includes a physical attributes description scheme 2810. The credits description scheme 2803 includes a creation description scheme 2811 which includes a 6-W description scheme 2812, a technical staff description scheme 2813, and an artistic staff description scheme 2814 which includes a physical attributes description scheme 2815. The creation purpose description scheme 2804 includes a target description scheme 2817 and a classification description scheme 2818. The publication description scheme 2806 includes an emission description scheme 2819, a users/audience description scheme 2820 and an edition description scheme 2821. The financial description scheme 2807 includes a costs description scheme 2822 and an income description scheme 2823.

Based on the MPEG-7 description schemes described from FIGS. 21–28, it is then possible to synthesize the feature extraction module which will extract features from the media data (audio or visual) based on the feature data model described in FIGS. 21–28.

Figure 29:
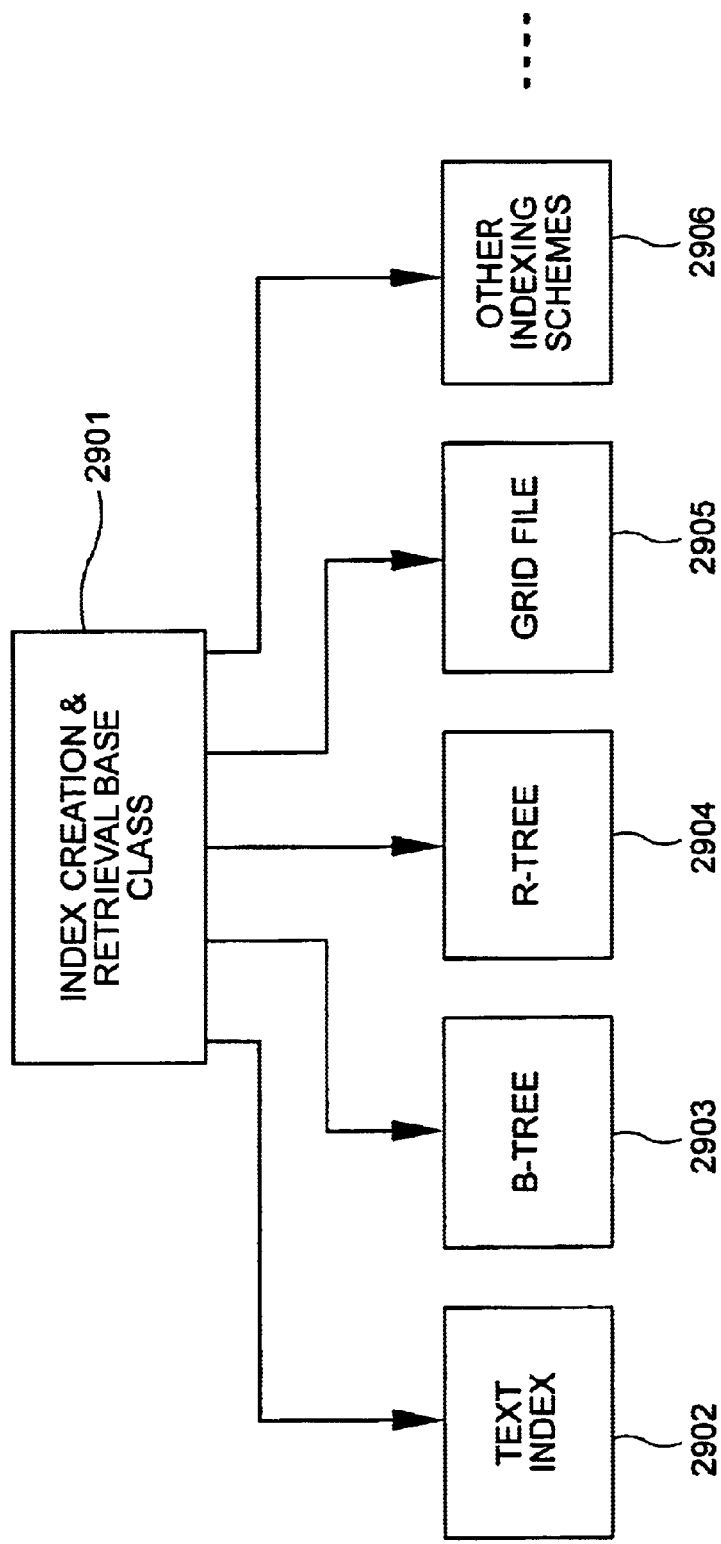
FIG. 29 shows a process of subclassing an index creation and retrieval base class into various indexing classes.

Referring now to FIG. 29, the index creation and retrieval class 2901 (shown as 1905 in FIG. 19) can be subclassed into text index 2902, B-tree 2903, R-tree 2904, grid file 2905, and other indexing schemes 2906. Some examples of other indexing schemes may include, but are not limited to, indexing structures which facilitate linear optimization queries as disclosed in the U.S. patent application identified by Ser. No. 09/360,366 (attorney docket no. YOR919990226US1) filed on Jul. 23, 1999 and entitled "Multidimensional Indexing Structure for Use with Linear Optimization Queries," the disclosure of which is incorporated by reference herein; and/or a hybrid clustering and R-tree indexing scheme as disclosed in the U.S. Pat. No. 6,122,628 (attorney docket no. YOR919970170US1) issued on Sep. 19, 2000 and entitled "Multidimensional Data Clustering and Dimension Reduction for Indexing and Searching," the disclosure of which is incorporated by reference herein.

In this case, the attributes in the base class include:
(1) Query q: the query q is used as the key to the search index;
(2) Constraint predicate C: which can be a range predicate for precise queries, such as $a_1 \leq q_1 \leq a_2$, $b_1 \leq q_2 \leq b_2$ if $q=(q_1,q_2)$, or the top K candidates for similarity queries; and
(3) Distance metric D: which allows the same set of keys to be evaluated differently (the distance metric will be described in more detail below).

As an example of a similarity-based query, $Q(q, K, L_2)$ will retrieve the top K candidates from the database which are similar to the query q using the $L_2$ distance metric. Alternatively, a constraint-based query Q(q, C) will retrieve those results that satisfy the constraint predicate C. The methods that are required for the base class, in general, include:
(1) Query: Q(q, C, D) retrieves the candidates that satisfy the constraint predicate C;

(2) Insert(q): insert the node which contains the key q into the index, and may involve splitting and balancing the tree; and
(3) Delete(q): deleting the node which contains the key q from the index, and may involve merging and balancing the tree.

Using these base classes, including the data structure and methods, various indexing classes can then be implemented.

Most of the extension modules for accessing various modalities require the use of some form of distance metric for computing the similarity between the candidates in the database and the target. The distance metric D(x,y) between two feature vectors $x=[x_1, \ldots, x_n]^T$, $y=[y_1, \ldots, y_n]^T$ includes the following possibilities:

(1) $L_0$: computes the distance using $\sum_{i=1}^{n} |x_i - y_i|$;

(2) $L_2$: computes the distance using $\sqrt{\sum_{i=1}^{n} (x_i - y_i)^2}$;

(3) $L_p$: computes the distance using $\left(\sum_{i=1}^{n} (x_i - y_i)^p\right)^{1/p}$;

(4) $L_\infty$: compute the distance using $\max_{i=1}^{n} |x_i - y_i|$; and (5) Generalized quadratic distance $(x-y)^T M(x-y)$ where the matrix M allows weights to be assigned to different components of the vector.

Figure 30:
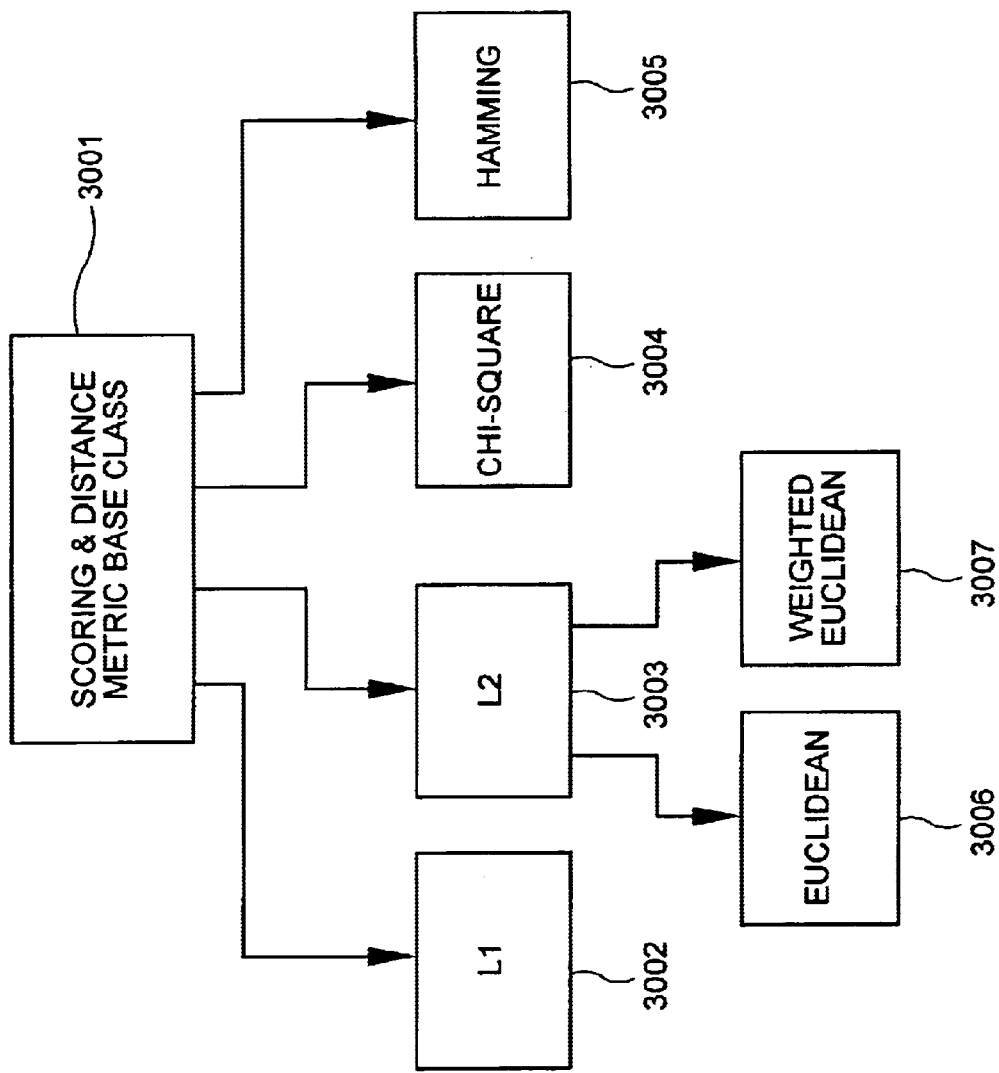
FIG. 30 shows a process of subclassing a scoring and distance metric base class into various distance functions.

Consequently, it is possible to define a base class distance metric between x and y, which includes the definitions of vectors x and y. As shown in FIG. 30, the scoring and distance metric base class 3001 (1906 as shown in FIG. 19) can then be subclassed into L1 distance 3002, L2 distance 3003, chi-square 3004, hamming 3005, etc. The L2 distance 3003 can be further subclassed into basic Euclidean 3006 and weighted Euclidean 3007. This structure allows maximum sharing of distance metrics when search engines for text, image, and video are constructed.

The base class for learning and iterative refinement (1907 as shown in FIG. 19), Dnew Learn(E, Doriginal, Q), involves the following:
(1) Category example E: which can simply be examples of relevant and irrelevant answers, or examples for each categories when the total number of categories are more than two. In most cases, the example set E is usually constrained to draw from the query results from Q;
(2) Dnew: which is the data set that has been transformed based on the examples and counter examples;
(3) Dorginal: which is the data set that is to be transformed through learning; and
(4) Q: is the query class for retrieving the top K candidates for a given query template, as defined above in the index base class.

Note that this class can be invoked recursively, i.e., each learning and iterative refinement will generate a new data set. The same query can then be applied and the classification of the query results can then be used for learning again. The iterative refinement process may take any suitable number of iterations, as the examples for each of the categories are only drawn from the query results, which are usually limited to a small number as compared to the overall dataset. Based on this class, various learning algorithms can then be subclassed including those adjusting the weights of the distance metric, as well as the algorithm disclosed in the U.S. patent application identified by Ser. No. 09/237,646 (attorney docket no. YOR919980220US1) filed on Jan. 26, 1999 and entitled "Method and Apparatus for Similarity Retrieval from Iterative Refinement," the disclosure of which is incorporated by reference herein, which applies nonlinear multi-dimensional scaling to "warp" the feature space based on the examples and counter examples provided through the learning process.

In a second aspect, the present invention provides a methodology for automatically synthesizing extension modules. By recognizing the fact that the data models and the methods associated with a search engine can be specified using interoperable meta-data such as XML schema, which is being standardized by World Wide Web Consortium, the methodology of the invention automatically generates the database-specific administrative tables, administrative commands, APIs and UDFs through the processing of such meta-data.

Figure 31:
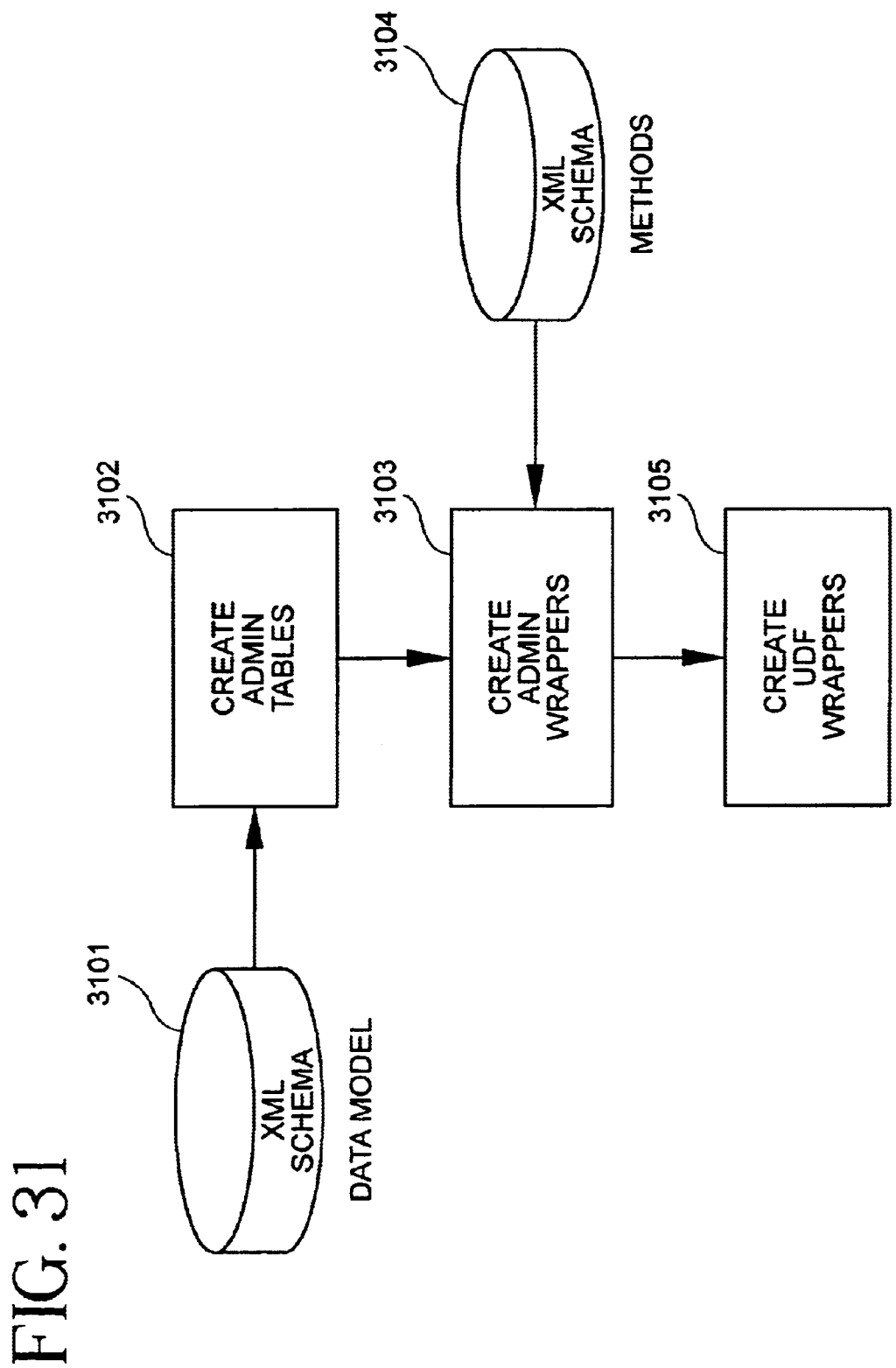
FIG. 31 shows a process of synthesizing wrappers for search engines to be plugged into the DB2 as an extension module.

FIG. 31 illustrates such an automatic extension module synthesis procedure according to an embodiment of the present invention. In step 3102, administrative tables are created, such as shown in FIG. 15, based on the XML schema data model 3101. This is accomplished in accordance with the following steps. The database management system defines the required administrative tables, such as one for recording general information (e.g., the location of files), and one for recording specific information (e.g., the features extracted from the data). The search engine defines the exact data model that describes the features and indexing scheme for the search engine. Examples of such data models include those audio-visual description schemes defined in FIGS. 22–28. Based on the specifications from the database management systems and the search engine, commands such as CREATE TABLE TABLE_NAME (Attribute1, Attribute2, Attribute3, . . . , AttributeN) are generated. The definitions of the attributes are derived from the data model specification.

Then, in step 3103, administrative wrappers are created, such as those defined in FIG. 9, based on the method descriptions 3104 defined in the XML schema.

The database management system specifies the types of functions that will be needed, including extender server start, server stop, server status, server trace, server verify on the server side, and enable/change/disable extender client, inquire extender client status, etc. The search engine specifies the available functions for extracting features, creating index, performing search, etc. As an example, program modules such as ENABLE TEXT COLUMN, as shown in FIG. 9, are created, which invoke a number of classes such as (1) extract text features; (2) create text index; and (3) create log file.

Next, in step 3105, UDF wrappers are created, such as those defined in FIG. 10 and FIG. 16, also based on the method descriptions. From the specifications of the search engine functions, the UDF module is created which allows the proper search functions (defined in FIGS. 10 and 16) to be created.

Figure 32:
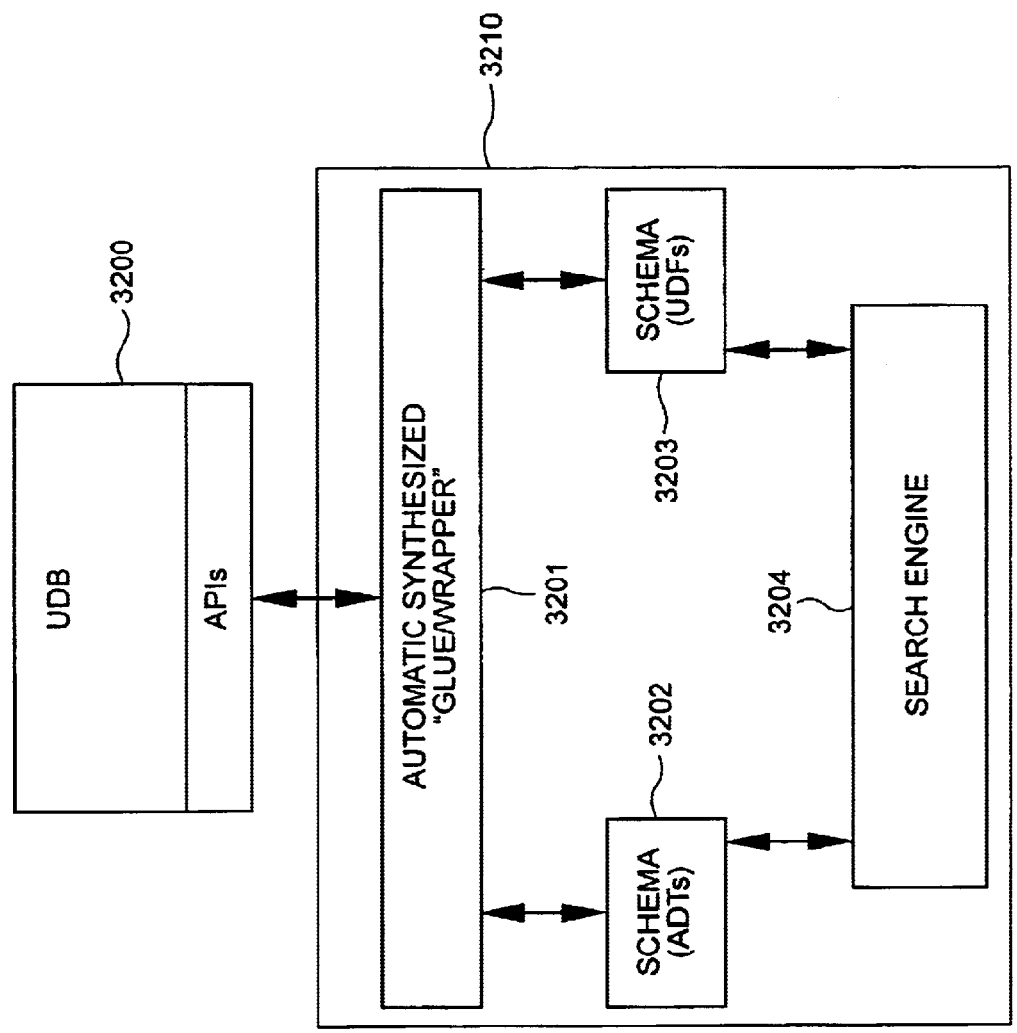
FIG. 32 shows a structure of a search engine as an extension module with an automatically synthesized wrapper.

FIG. 32 illustrates the structure of a search engine which is transformed into an extension module 3210 through the automatic synthesis process of the invention described above. The wrappers synthesized in FIG. 31 are shown as automatic synthesized glue/wrapper 3201. In order to synthesize these wrappers, the search engine 3204 needs to specify its schema 3202 and services (UDFs) 3203 explicitly.

Figure 33A:
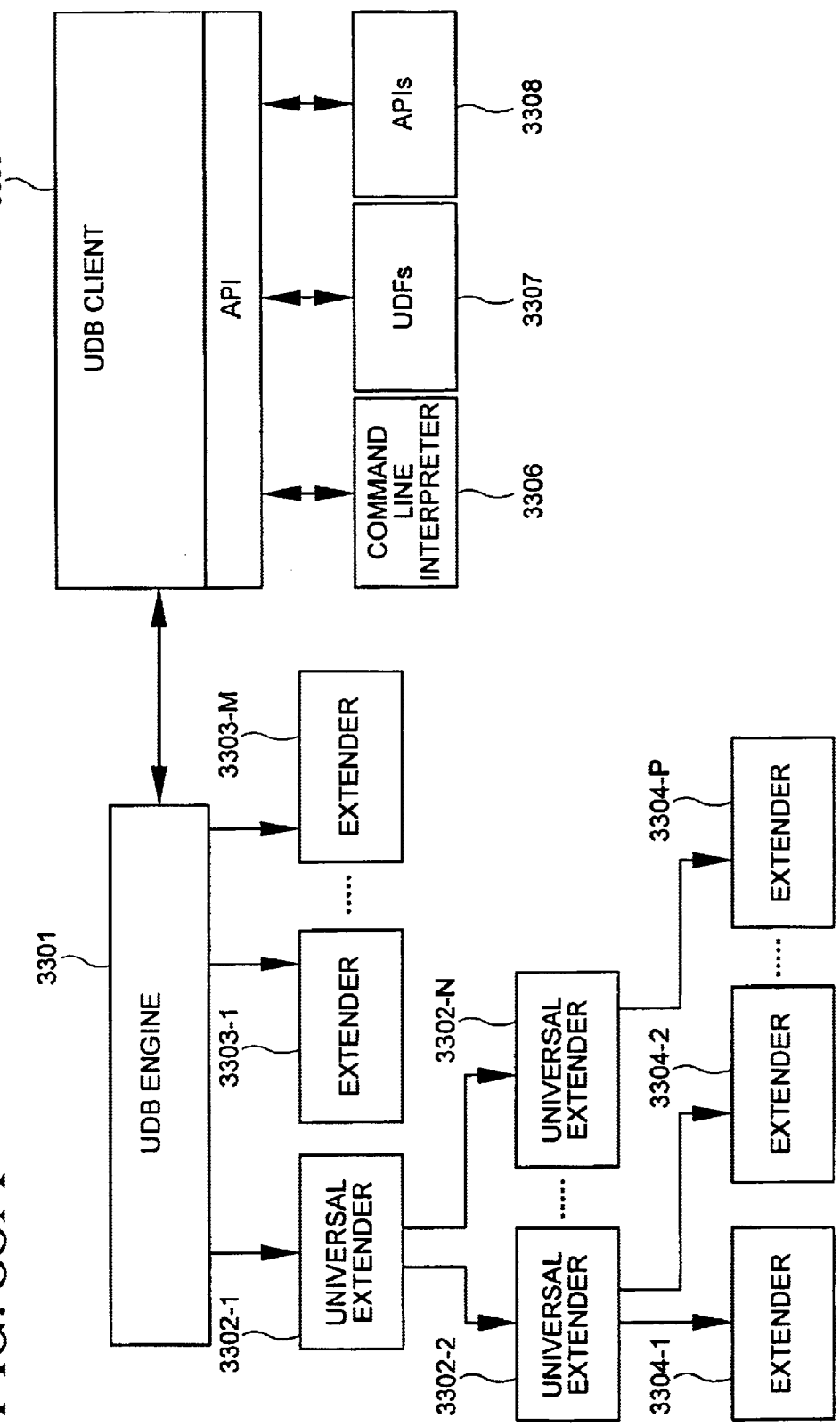
FIG. 33A shows a hierarchical decomposition of universal extension modules to handle new operators and search capabilities according to the present invention.

In a third aspect, the present invention provides for a hierarchical decomposition of extension module functions so that universal extension modules can be invoked hierarchically, as shown in FIG. 33A. In this case, a first universal extension module (referred to as a universal extender in FIG. 33A) 3302-1 is operatively connected to a DB2 UDB engine 3301. Additional universal extenders 3302-2 through 3302-N can be attached hierarchically to the first extension module, as shown. The leaf nodes of the universal extension modules are the domain-specific extension modules (e.g., extenders, data cartridges, datablades, etc.) and are denoted as 3304-1 through 3304-P. The domain-specific extenders that connect directly to the UDB engine 3301 are denoted as 3303-1 through 3303-M. The UDB client 3305, coupled to the UDB engine 3301 via a network (not shown), may be configured similar to that shown in FIG. 8, with a command line interpreter 3306, UDFs 3307 and APIs 3308. The various universal extenders and domain-specific extenders in FIG. 33A may be implemented on one or more extender server computer systems and/or on the server computer system implementing the UDB engine.

Figure 33B:
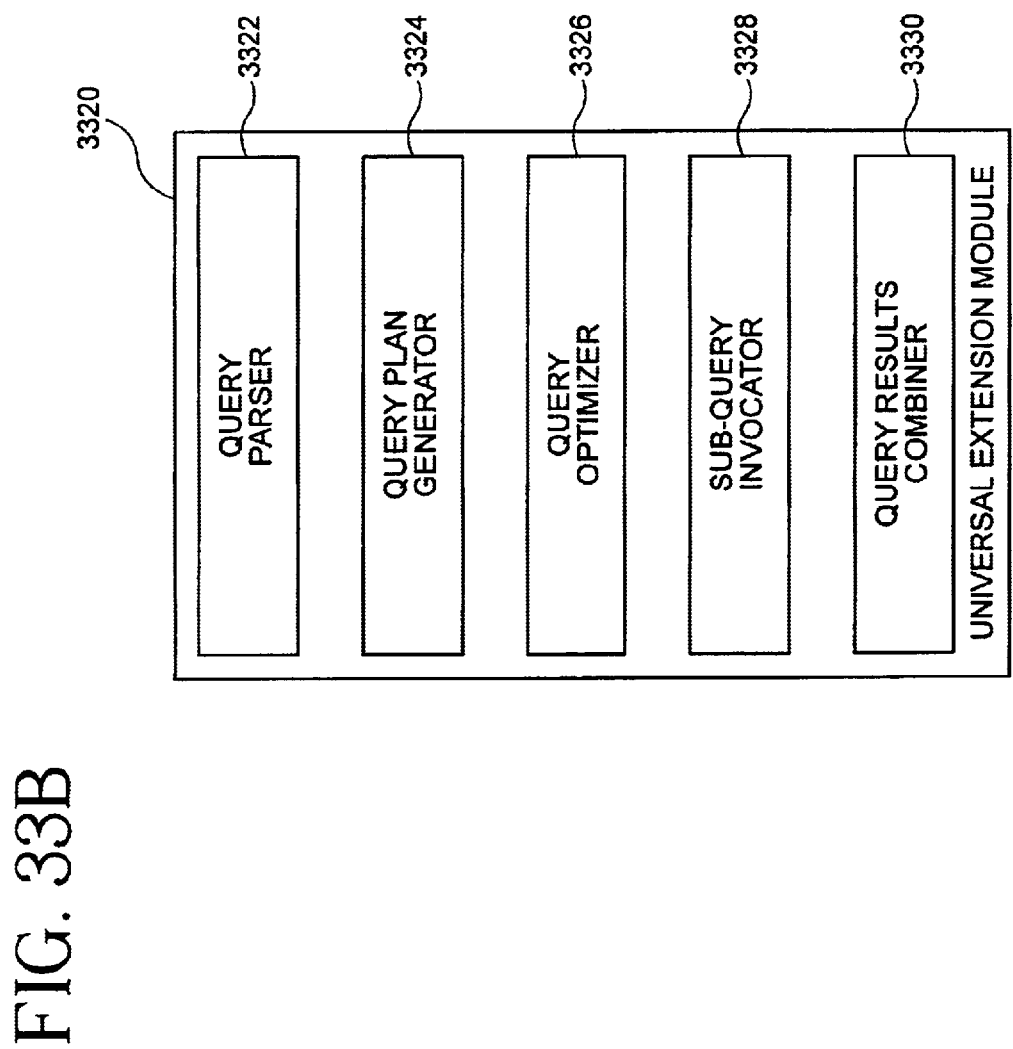
FIG. 33B illustrates a block diagram of functional components associated with a universal extension module according to an embodiment of the present invention.

One main difference between a universal extension module and a domain-specific extension module is that the universal extension module has the capability of parsing the query from its parents in the hierarchy (e.g., the UDB or other universal extenders higher in the hierarchy), and decomposing the query into one or more sub-queries in order to pass the sub-queries to other universal extenders or domain-specific extenders. Consequently, as illustrated in FIG. 33B, each universal extension module 3320 may have some or all of the following capabilities:

(1) Query parsing: parsing the queries passed from other universal extenders or UDB. These queries may not observe the SQL query syntax that is used for relational queries. The query parsing function may be implemented in accordance with query parser 3322;

(2) Query plan generation: generate an execution plan from the queries. The query plan generation function may be implemented in accordance with query plan generator 3324;

(3) Query optimization: re-arrange the query plan so that the execution time can be minimized. The query optimization function may be implemented in accordance with query optimizer 3326;

(4) Sub-query invocation: passing the sub-queries to other universal extenders or domain-specific extenders downstream. The sub-query invocation function may be implemented in accordance with sub-query invocator 3328; and (5) Query results combining: combine (join) the results from those universal extenders or extenders attached to a particular universal extender. The query results combining function may be implemented in accordance with query results combiner 3330.

Note that it is also possible that some of the query plan execution may involve backtracking of the query plan. Consequently, steps (4) and (5) above may be invoked multiple times. In some cases, UDB callback is also necessary as it is possible that some of the SQL queries may have to be embedded in the universal extender query.

Since a universal extension module has to be able to return a table, the module can be implemented as a user-defined table function. Furthermore, since the universal extension module has its own query parsing mechanism, there is no restriction on the query language that can be used.

Figure 34:
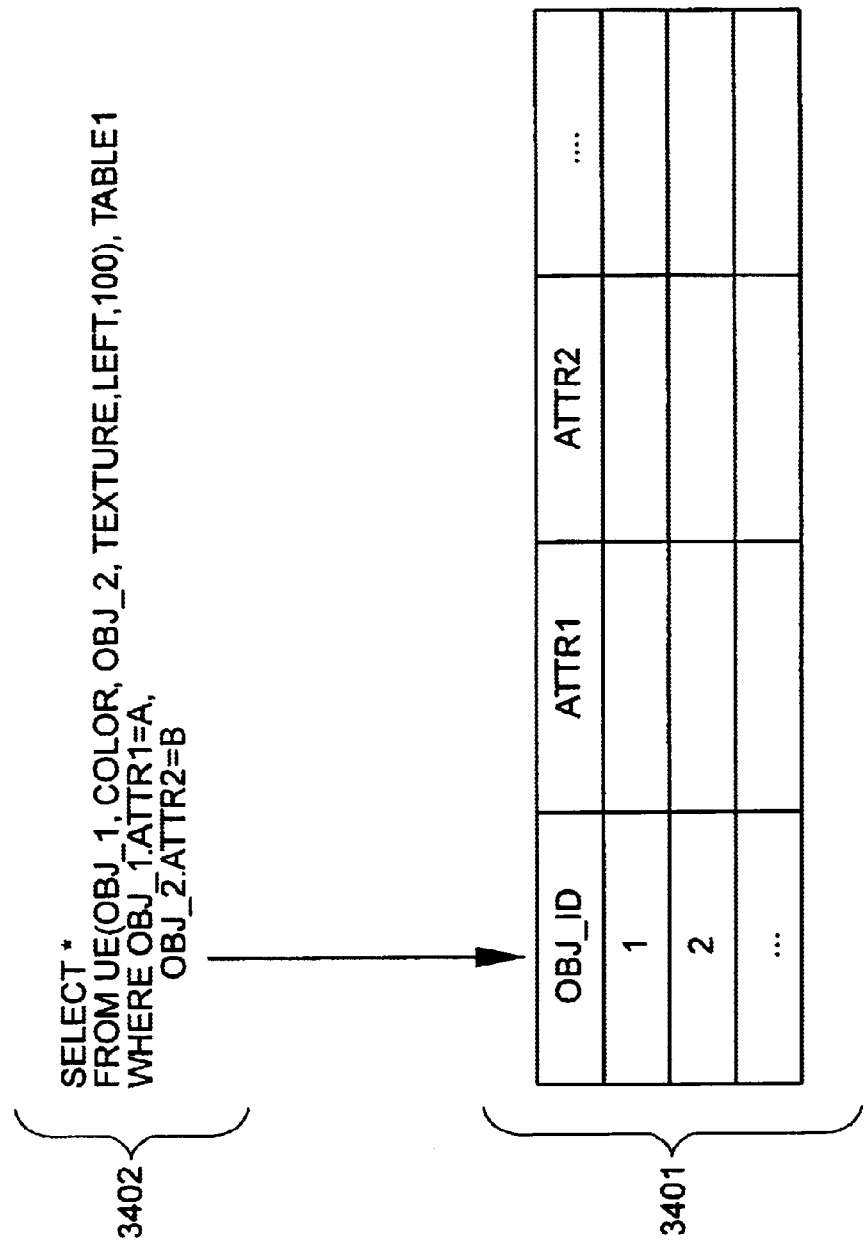
FIG. 34 shows a code sample of invoking a universal extension module as a table function.

FIG. 34 shows an example of a universal extension module-invoking sequence using SQL. The user table 3401 includes obj_id (primary key), attr1, attr2, etc. The universal extension module, which is implemented as a user-defined table function 3402, has the form:

UE(obj_1, color, obj_2, texture, left, 100)

which retrieves the top 100 objects which include two sub-objects, one to the left of the other. Object 1 (obj_1) is specified in terms of its color, while object 2 (obj_2) is specified in terms of its texture. Additional parametric constraints are also specified, i.e., obj_1.attr1 =a, obj_2.attr2=b.

Figure 35:
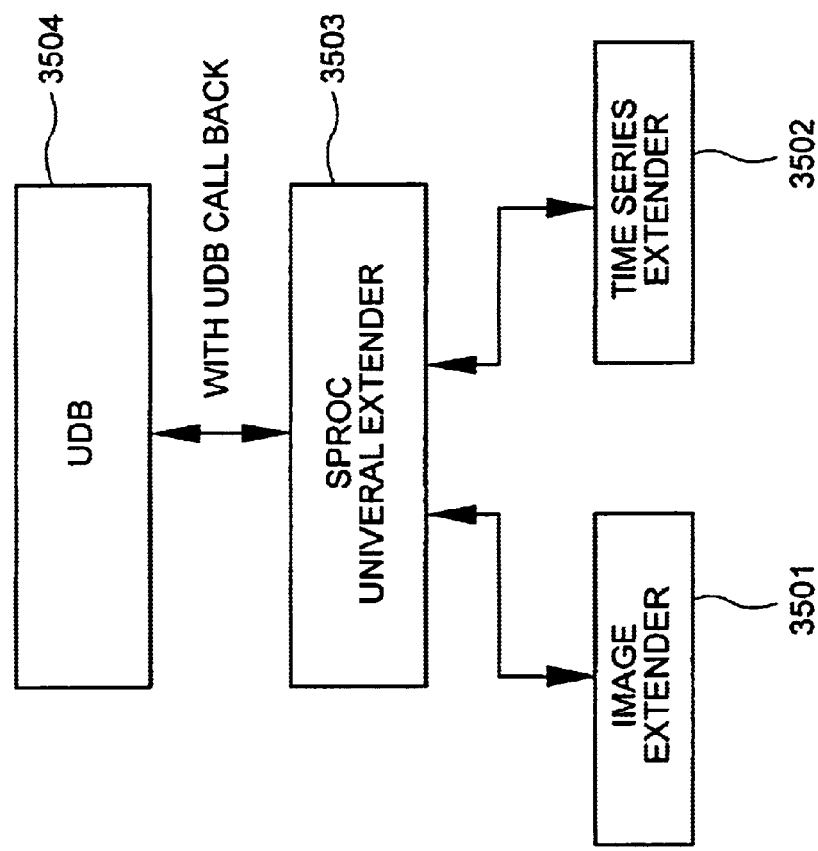
FIG. 35 shows a structure of an SPROC universal extension module which invokes additional extenders.

FIG. 35 illustrates an example in which a universal extension module 3503 based on the SPROC algorithm is attached to the UDB 3504. The SPROC algorithm is disclosed in the U.S. patent application identified by Ser. No. 09/237,734 (attorney docket no. YO919980274US1) filed on Jan. 26, 1999 and entitled "System and Method for Sequential Processing for Content-Based Retrieval of Composite Objects," the disclosure of which is incorporated by reference herein. The universal extension module in turn invokes either an image extender 3501 or a time series extender 3502.

The above-mentioned SPROC algorithm is designed for generating query results for bundled search problems. The bundle search is to simultaneously search multiple items with possible inter-item relationships. It is one of the most important enabling mechanisms in multi-modal signal detection and information fusion. For example, a fuzzy Cartesian (bundle search) query can be locating a rock strata structure across borehole images in an image database storing oil/gas exploration data. In this example, the strata template consists of three layers of rocks labeled as A, B, and C. A good match shall preserve the layering order but not necessarily the amount of separation between adjacent layers. For example, a strata structure A, B, D, and C may still be acceptable if the separation between B and C is not too large. In a borehole image, there can be tens or hundreds of rock layers with each layer showing different texture or color. Matching of rock images often involves assigning a fuzzy score in the range of zero to one to signify the confidence of the similarity of a region. By fuzzy characterization, a region can have multiple scores to multiple templates, such as 0.8 to A and 0.2 to B.

The fuzzy Cartesian problem in strata matching is to select the top-K structures that have the highest scores as compared to the template. For any three distinct image regions, one can calculate the fuzzy score to A of the top region, the score to B of the middle region, and the score to C of the bottom region. These scores are combined with the fuzzy scores weighting the distance between the top and the middle, as well as that between the middle and the bottom.

Figure 36:
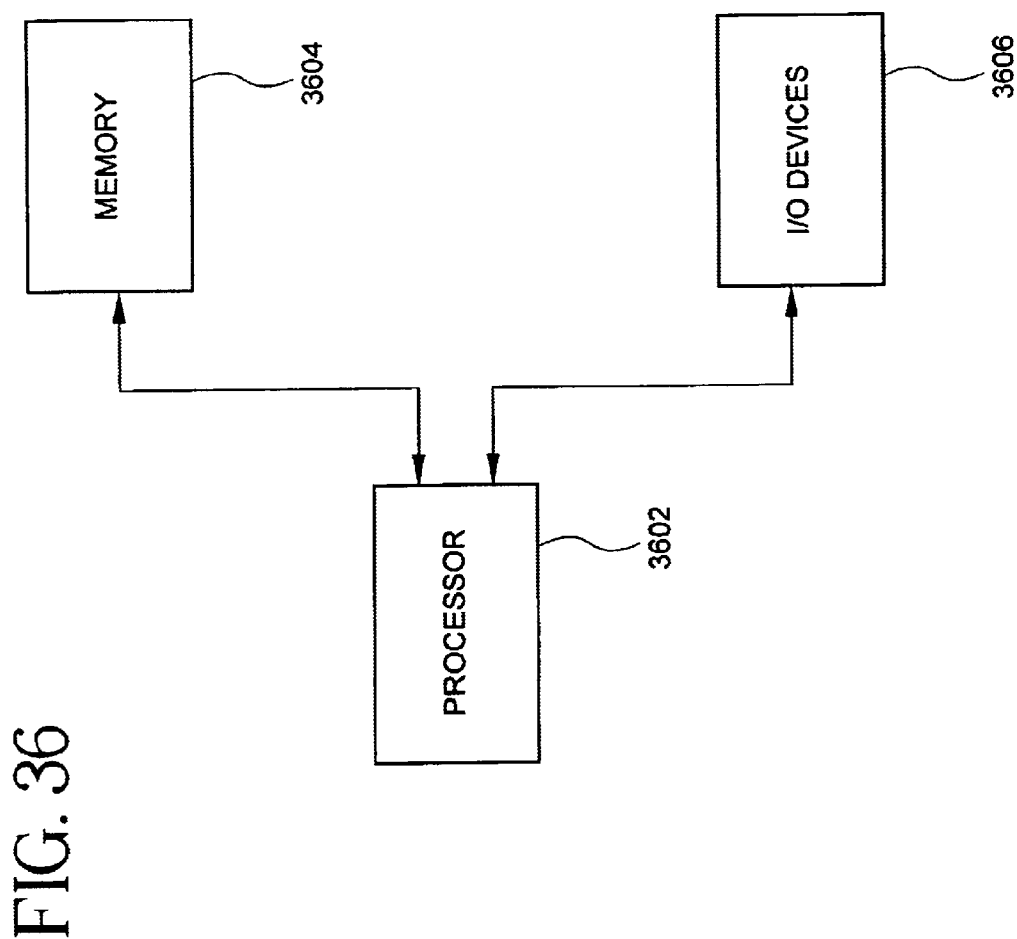
FIG. 36 is a block diagram illustrating a generalized hardware architecture of a computer system suitable for implementing various aspects of the present invention.

Referring now to FIG. 36, a block diagram is shown illustrating a generalized hardware architecture of a computer system suitable for implementing one or more universal extension modules according to the invention as described in detail herein. The computer system may also implement one or more domain-specific extension modules and a database engine. Further, the computer system may implement the entire server side of the database system and be connected to one or more similar computer systems used to implement the database clients. Such computer systems may be coupled via a network (e.g., Internet, Intranet, etc.)

As shown in FIG. 36, the computer system may comprise a processor 3602, a memory 3604 and I/O devices 3606. It is to be appreciated that the term "processor" as used herein is intended to include any processing device, such as, for example, one that includes a CPU (central processing unit) and/or other processing circuitry. The processor may also include a digital signal processor, as is well known in the art. The term "memory" as used herein is intended to include memory associated with a processor or CPU, such as, for example, RAM, ROM, a fixed memory device (e.g., hard drive), a removable memory device (e.g., diskette), flash memory, etc. In addition, the term "input/output devices" or "I/O devices" as used herein is intended to include, for example, one or more input devices (e.g., keyboard, mouse, etc.) for entering data to the processing unit, and/or one or more output devices (e.g., CRT display, printer, etc.) for presenting results associated with the processing unit. It is also to be understood that the term "processor" may refer to more than one processing device and that various elements associated with a processing device may be shared by other processing devices.

Accordingly, software components including instructions or code for performing the methodologies of the invention, as described herein, may be stored (e.g., as an article of manufacture) in one or more of the associated memory devices (e.g., ROM, fixed or removable memory) and, when ready to be utilized, loaded in part or in whole (e.g., into RAM) and executed by a CPU.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of extending a functionality of an object-relational database engine, wherein one or more domain-specific extension modules are provided for use in association with the object-relational database engine, the one or more domain-specific extension modules providing one or more mechanisms for enabling the object-relational database engine to handle domain-specific data types, the method comprising the step of:

operationally interposing at least one universal extension module between the object-relational database engine and at least one of the one or more domain-specific extension modules, the at least one universal extension module substantially facilitating one or more operations associated with the object-relational database engine and the at least one domain-specific extension module, the at least one universal extension module substantially facilitating a subsequent addition of at least another domain-specific extension module, and the at least one universal extension module being operable to perform one or more query processing functions.

2. The method of claim 1, wherein at least one of the one or more domain-specific extension modules provides for handling of semi-structured data.

3. The method of claim 2, wherein the semi-structured data comprises at least one of extensible markup language data and hypertext markup language data.

4. The method of claim 1, wherein the at least one universal extension module comprises a plug-and-play interface for one or more domain-specific extension modules.

5. The method of claim 1, wherein the at least one universal extension module implemented in accordance with meta-data comprising at least one of a schema and semantics of the database.

6. A method of extending a functionality of an object-relational database engine, wherein one or more domain-specific extension modules are provided for use in association with the object-relational database engine, the one or more domain-specific extension modules providing one or more mechanisms for enabling the object-relational database engine to handle domain-specific data types, the method comprising the step of:

operationally interposing at least one universal extension module between the object-relational database engine and at least one of the one or more domain-specific extension modules, the at least one universal extension module substantially facilitating one or more operations associated with the object-relational database engine and the at least one domain-specific extension module, and the at least one universal extension module substantially facilitating a subsequent addition of at least another domain-specific extension module; and wherein the at least one universal extension module comprises a plug-and-play interface for one or more domain-specific extension modules.

7. A method of extending a functionality of an object-relational database engine, wherein one or more domain-specific extension modules are provided for use in association with the object-relational database engine, the one or more domain-specific extension modules providing one or more mechanisms for enabling the object-relational database engine to handle domain-specific data types, the method comprising the step of:

operationally interposing at least one universal extension module between the object-relational database engine and at least one of the one or more domain-specific extension modules, the at least one universal extension module substantially facilitating one or more operations associated with the object-relational database engine and the at least one domain-specific extension module, and the at least one universal extension module substantially facilitating a subsequent addition of at least another domain-specific extension module; and wherein the at least one universal extension module is implemented in accordance with meta-data comprising at least one of a schema and semantics of the database.

8. An object-relational database system having a multi-tier structure, the system comprising:

an object-relational database engine serving as one tier of the structure;

one or more domain-specific extension modules, serving as another tier of the structure, for use in association with the object-relational database engine, the one or more domain-specific extension modules providing one or more mechanisms for enabling the object-relational database engine to handle domain-specific data types; and at least one universal extension module, serving as yet another tier of the structure, operationally interposed between the object-relational database engine and at least one of the one or more domain-specific extension modules, the at least one universal extension module substantially facilitating one or more operations associated with the object-relational database engine and the at least one domain-specific extension module, and the at least one universal extension module substantially facilitating a subsequent addition of at least another domain-specific extension module, and the at least one universal extension module being operable to perform one or more query processing functions.

9. The system of claim 8, wherein the system provides an extensible structure for one or more software modules that provides an object-oriented extension of a relational database.

10. The system of claim 8, wherein the system provides for automatic synthesis of one or more extender wrappers from one or more existing software modules.

11. The system of claim 8, wherein the system provides for constructing one or more extension modules which provide one or more advanced non-relational query processing capabilities.

12. The system of claim 8, wherein at least one of the one or more domain-specific extension modules provides for handling of semi-structured data.

13. The system of claim 12, wherein the semi-structured data comprises at least one of extensible markup language data and hypertext markup language data.

14. The system of claim 8, wherein the at least one universal extension module comprises a plug-and-play interface for one or more domain-specific extension modules.

15. The system of claim 8, wherein the at least one universal extension module is implemented in accordance with meta-data comprising at least one of a schema and semantics of the database.

16. An article of manufacture for use in accordance with a database system, wherein the database system includes an object-relational database engine and one or more domain-specific extension modules for use in association with the object-relational database engine, the one or more domain-specific extension modules providing one or more mechanisms for enabling the database engine to handle domain-specific data types, the article comprising a machine readable medium containing one or more programs which when executed implement the step of:

operationally interposing at least one universal extension module between the object-relational database engine and at least one of the one or more domain-specific extension modules, the at least one universal extension module substantially facilitating one or more operations associated with the object-relational database engine and the at least one domain-specific extension module, the at least one universal extension module substantially facilitating a subsequent addition of at least another domain-specific extension module, and the at least one universal extension module being operable to perform one or more query Processing functions.

17. In a client/server-based object-relational database system, wherein a client computer submits a query to at least one server computer with which the object-relational database system is associated, the at least one server computer processing the query in accordance with a multi-tier structure comprising:

an object-relational database engine;

one or more domain-specific extension modules for use in association with the object-relational database engine, the one or more domain-specific extension modules providing one or more mechanisms for enabling the object-relational database engine to handle domain-specific data types; and at least one universal extension module operationally interposed between the object-relational database engine and at least one of the one or more domain-specific extension modules, the at least one universal extension module substantially facilitating one or more operations associated with the object-relational database engine and the at least one domain-specific extension module, the at least one universal extension module substantially facilitating a subsequent addition of at least another domain-specific extension module, and the at least one universal extension module being operable to perform one or more query Processing functions.

18. An object-relational database system having a multi-tier structure, the system comprising:

an object-relational database engine serving as one tier of the structure;

one or more domain-specific extension modules, serving as another tier of the structure, for use in association with the object-relational database engine, the one or more domain-specific extension modules providing one or more mechanisms for enabling the object-relational database engine to handle domain-specific data types; and at least one universal extension module, serving as yet another tier of the structure, operationally interposed between the object-relational database engine and at least one of the one or more domain-specific extension modules, the at least one universal extension module substantially facilitating one or more operations associated with the object-relational database engine and the at least one domain-specific extension module, and the at least one universal extension module substantially facilitating a subsequent addition of at least another domain-specific extension module; wherein the at least one universal extension module comprises a plug-and-play interface for one or more domain-specific extension modules.

19. An object-relational database system having a multi-tier structure, the system comprising:

an object-relational database engine serving as one tier of the structure;

one or more domain-specific extension modules, serving as another tier of the structure, for use in association with the object-relational database engine, the one or more domain-specific extension modules providing one or more mechanisms for enabling the object-relational database engine to handle domain-specific data types; and at least one universal extension module, serving as yet another tier of the structure, operationally interposed between the object-relational database engine and at least one of the one or more domain-specific extension modules, the at least one universal extension module substantially facilitating one or more operations associated with the object-relational database engine and the at least one domain-specific extension module, and the at least one universal extension module substantially facilitating a subsequent addition of at least another domain-specific extension module;

wherein the at least one universal extension module is implemented in accordance with meta-data comprising at least one of a schema and semantics of the database.

\* \* \* \* \*

UNITED STATES PATENT AND TRADEMARK OFFICE
CERTIFICATE OF CORRECTION

PATENT NO. : 6,697,818 B2
DATED : February 24, 2004
INVENTOR(S) : C-S. Li et al.

It is certified that error appears in the above-identified patent and that said Letters Patent is hereby corrected as shown below:

Column 17,
Line 58, delete "and".

Column 18,
Line 6, delete "advanced".

Column 19,
Line 11, start a new paragraph after "and".
Line 22, start a new paragraph before "wherein".

Signed and Sealed this

Eighth Day of June, 2004

JON W. DUDAS
*Acting Director of the United States Patent and Trademark Office*